US009365274B1

(12) United States Patent
George et al.

(10) Patent No.: US 9,365,274 B1
(45) Date of Patent: Jun. 14, 2016

(54) OUTBOARD MARINE PROPULSION DEVICES HAVING COOLING SYSTEMS

(71) Applicant: Brunswick Corporation, Lake Forest, IL (US)

(72) Inventors: Trevor George, Eldorado, WI (US); George D. Idzikowski, Lomira, WI (US); Gregg D. Langenfeld, Fond du Lac, WI (US); Mark A. Kollock, Oshkosh, WI (US); Douglas D. Reichardt, West Bend, WI (US); Charles H. Eichinger, Oshkosh, WI (US); Mark J. Glodowski, De Pere, WI (US); Christopher J. Taylor, Liberty Township, OH (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/543,458

(22) Filed: Nov. 17, 2014

Related U.S. Application Data

(60) Provisional application No. 61/906,025, filed on Nov. 19, 2013.

(51) Int. Cl.
*B63H 20/24* (2006.01)
*F01N 3/04* (2006.01)
(Continued)

(52) U.S. Cl.
CPC ............... *B63H 20/24* (2013.01); *B63H 20/28* (2013.01); *F01N 3/2046* (2013.01); *F01N 13/004* (2013.01); *F01P 3/202* (2013.01)

(58) Field of Classification Search
CPC ...... B63H 20/24; B63H 20/28; F01N 3/2046; F01N 13/004; F01P 3/202; F01P 2003/028
USPC ........ 440/88 C, 88 D, 88 G, 88 J, 88 M, 88 P, 440/88 HE, 88 T, 89 A, 89 B, 89 C, 89 G, 89 H, 440/89 R
See application file for complete search history.

(56) References Cited

U.S. PATENT DOCUMENTS

| 3,358,654 A | 12/1967 | Shanahan et al. |
| 5,036,804 A | 8/1991 | Shibata |

(Continued)

OTHER PUBLICATIONS

Non Catalyst Cooling System—Mercury FS150, at least as early as May 25, 2007.

(Continued)

*Primary Examiner* — Anthony Wiest
(74) *Attorney, Agent, or Firm* — Andrus Intellectual Property Law, LLP

(57) ABSTRACT

An outboard marine propulsion device comprises an internal combustion engine having a cylinder head and a cylinder block and an exhaust manifold that discharges exhaust gases from the engine towards a vertically elongated exhaust tube. The exhaust manifold has a plurality of inlet runners that receive the exhaust gases from the engine, and a vertically extending collecting passage that conveys the exhaust gases from the plurality of inlet runners upwardly to a bend that redirects the exhaust gases downwardly towards the exhaust tube. A cooling water jacket is on the exhaust manifold and conveys cooling water alongside the exhaust manifold. A catalyst housing is coupled to the exhaust manifold and a cooling water jacket is on the catalyst housing and carries cooling water alongside the catalyst housing. A catalyst is disposed in the catalyst housing.

19 Claims, 24 Drawing Sheets

(51) Int. Cl.
*F01P 3/20* (2006.01)
*F01N 3/20* (2006.01)
*F01N 13/00* (2010.01)
*B63H 20/28* (2006.01)

(56) References Cited

U.S. PATENT DOCUMENTS

| | | | |
|---|---|---|---|
| 5,048,467 A | 9/1991 | Kojima | |
| 5,452,866 A | 9/1995 | Bulman | |
| 5,752,866 A | 5/1998 | Takahashi et al. | |
| 5,873,330 A | 2/1999 | Takahashi et al. | |
| 5,893,783 A | 4/1999 | Hiraoka et al. | |
| 5,904,605 A | 5/1999 | Kawasaki et al. | |
| 5,916,135 A | 6/1999 | Yoshida et al. | |
| 5,975,032 A | 11/1999 | Iwata | |
| 5,980,340 A | 11/1999 | Okamoto | |
| 6,071,159 A | 6/2000 | Watanabe et al. | |
| 6,135,833 A | 10/2000 | Tsunoda | |
| 6,276,327 B1 | 8/2001 | Fukuoka et al. | |
| 6,471,559 B2 | 10/2002 | Kashima | |
| 6,513,463 B2 | 2/2003 | Katayama | |
| 6,758,173 B2 | 7/2004 | Saito et al. | |
| 6,890,228 B2 | 5/2005 | Tawa et al. | |
| 6,921,306 B2 | 7/2005 | Tawa et al. | |
| 6,976,892 B2 | 12/2005 | Tawa et al. | |
| 7,069,882 B2 | 7/2006 | Yonezawa et al. | |
| 7,114,469 B1 | 10/2006 | Taylor | |
| 7,264,520 B1 | 9/2007 | Taylor et al. | |
| 7,318,396 B1 | 1/2008 | Belter et al. | |
| 7,867,048 B2 | 1/2011 | Ochiai | |
| 8,002,597 B2 | 8/2011 | Ochiai | |
| 8,011,985 B2 | 9/2011 | Ochiai | |
| 8,118,631 B2 | 2/2012 | Ochiai | |
| 8,298,026 B2 | 10/2012 | Ochiai | |
| 8,402,930 B1 | 3/2013 | Taylor et al. | |
| 8,479,691 B1 | 7/2013 | Taylor et al. | |
| 8,500,501 B1 | 8/2013 | Taylor et al. | |
| 8,540,536 B1 | 9/2013 | Eichinger et al. | |
| 8,696,394 B1 | 4/2014 | Langenfeld et al. | |
| 8,763,566 B1 | 7/2014 | Taylor et al. | |
| 8,783,217 B1 | 7/2014 | Taylor et al. | |
| 2002/0069912 A1 | 6/2002 | Prentice | |
| 2002/0166518 A1 | 11/2002 | Osakabe | |
| 2005/0042949 A1 | 2/2005 | Tawa et al. | |
| 2005/0229874 A1 | 10/2005 | Yonezawa et al. | |
| 2006/0254272 A1 | 11/2006 | Petutsching et al. | |
| 2009/0130928 A1 | 5/2009 | Taylor et al. | |
| 2013/0203308 A1 | 8/2013 | Kato et al. | |
| 2013/0203309 A1 | 8/2013 | Suzuki | |
| 2014/0242858 A1* | 8/2014 | Ochiai | B63H 20/28 440/88 M |
| 2014/0242859 A1* | 8/2014 | Ochiai | B63H 20/28 440/88 M |

OTHER PUBLICATIONS

Non Catalyst Cooling System—Mercury Verado, at least as early as May 25, 2007.

\* cited by examiner

OUTBOARD MARINE PROPULSION DEVICES HAVING COOLING SYSTEMS

CROSS REFERENCE TO RELATED APPLICATION

This application claims the benefit of and priority to U.S. Provisional Patent Application No. 61/906,025, filed Nov. 19, 2013, which is hereby incorporated by reference in entirety.

FIELD

The present disclosure relates to marine engines and cooling systems for marine engines, and particularly to in-line, four-stroke marine engines having one or more catalysts for treating exhaust gas.

BACKGROUND

The following U.S. patents are incorporated herein by reference:

U.S. Pat. No. 8,783,217 discloses a cooling system for a marine engine with various cooling channels and passages. The cooling system allows the rates of flow of its internal streams of water to be preselected so that heat can be advantageously removed at varying rates for different portions of the engine. In addition, the direction of flow of cooling water through the various passages assists in the removal of heat from different portions of the engine at different rates so that overheating can be avoided in certain areas, such as the exhaust manifold and cylinder head, while overcooling is avoided in other areas, such as the engine block.

U.S. Pat. No. 8,763,566 discloses a cooling system for a marine engine with various cooling channels, which allow the advantageous removal of heat at different rates from different portions of the engine. A split flow of water is conducted through the cylinder head, in opposite directions, to individually cool the exhaust port and intake ports at different rates. This increases the velocity of coolant flow in the downward direction through the cylinder head to avoid the accumulation of air bubbles and the formation of air pockets that could otherwise cause hot spots within the cylinder head. A parallel coolant path is provided so that a certain quantity of water can bypass the engine block and avoid overcooling the cylinder walls.

U.S. Pat. No. 8,696,394 discloses a marine propulsion system comprising an internal combustion engine, a cooling circuit carrying cooling fluid that cools the internal combustion engine, a sump holding oil that drains from the internal combustion engine, and a heat exchanger receiving the cooling fluid. The oil that drains from the internal combustion engine to the sump passes through and is cooled by the heat exchanger.

U.S. Pat. No. 8,540,536 discloses a cooling system for a marine engine having an elongated exhaust conduit comprising a first end receiving hot exhaust gas from the marine engine and a second end discharging the exhaust gas. An elongated cooling water jacket extends adjacent to the exhaust conduit. The cooling water jacket receives raw cooling water at a location proximate to the second end of the exhaust conduit, conveys raw cooling water adjacent to the exhaust conduit to thereby cool the exhaust conduit and warm the raw cooling water, and thereafter discharges the warmed cooling water to cool the internal combustion engine.

U.S. Pat. No. 8,500,501 discloses an outboard marine drive including a cooling system that draws cooling water from a body of water in which the outboard marine drive is operating, and supplies the cooling water through cooling passages in an exhaust tube in the driveshaft housing, a catalyst housing, and an exhaust manifold, and thereafter through cooling passages in the cylinder head and the cylinder block of the engine. A 3-pass exhaust manifold is provided. A method is provided for preventing condensate formation in a cylinder head, catalyst housing, and exhaust manifold of an internal combustion engine of a powerhead in an outboard marine drive.

U.S. Pat. No. 8,479,691 discloses a cooling system for a marine engine with various cooling channels which allow the advantageous removal of heat at different rates from different portions of the engine. A split flow of water is conducted through the cylinder head, in opposite directions, to individually cool the exhaust port and intake ports at different rates. This increases the velocity of coolant flow in the downward direction through the cylinder head to avoid the accumulation of air bubbles and the formation of air pockets that could otherwise cause hot spots within the cylinder head. A parallel coolant path is provided so that a certain quantity of water can bypass the engine block and avoid overcooling the cylinder walls.

U.S. Pat. No. 8,402,930 discloses a cooling system for a marine engine with various cooling channels and passages which allow the rates of flow of its internal streams of water to be preselected so that heat can be advantageously removed at varying rates for different portions of the engine. In addition, the direction of flow of cooling water through the various passages assists in the removal of heat from different portions of the engine at different rates so that overheating can be avoided in certain areas, such as the exhaust manifold and cylinder head, while overcooling is avoided in other areas, such as the engine block.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, an outboard marine propulsion device comprises an internal combustion engine having a cylinder head and a cylinder block, and an exhaust manifold that discharges exhaust gases from the engine to a vertically elongated exhaust tube. The exhaust manifold has a plurality of inlet runners that receive the exhaust gases from the engine, and a vertically extending collecting passage that conveys the exhaust gases from the plurality of inlet runners to a bend that redirects the exhaust gases downwardly towards the exhaust tube. A cooling water jacket is on the exhaust manifold. The cooling water jacket conveys cooling water alongside the exhaust manifold. At least one cooling passage is in the engine and conveys cooling water through the engine. A catalyst housing is coupled to the exhaust manifold. A cooling water jacket is on the catalyst housing and carries cooling water alongside the catalyst housing. A pump pumps cooling water from upstream to downstream through the cooling water jacket on the catalyst housing, the cooling water jacket on the exhaust manifold, and the at least one cooling passage in the cylinder head. A tell-tale outlet receives cooling water upstream of the cooling water jacket on the catalyst housing and discharges the cooling water from the outboard marine propulsion device.

In certain examples, the cooling water jacket on the exhaust manifold comprises a series of cooling passages including a first cooling passage that conveys cooling water upwardly to the bend, a second cooling passage that conveys the cooling water downwardly past the collecting passage, and third cooling passage that conveys the cooling water back upwardly past the collecting passage and inlet runners to the engine. The second cooling passage has an inlet end and an outlet end. The third cooling passage has an inlet end and an outlet end. An air purge passage connects the inlet end of the second cooling passage and the outlet end of the third cooling passage.

In certain examples, the series of cooling passages in the cylinder head includes a first cooling passage that conveys the cooling water downwardly in the cylinder head and a second cooling passage that conveys the cooling water upwardly in the cylinder head. The first cooling passage comprises an inlet end and an outlet end. The second cooling passage comprises an inlet end and an outlet end. An air purge passage connects the inlet end of the first cooling passage to the outlet end of the second cooling passage.

In certain examples, a catalyst housing is coupled to the exhaust manifold. A cooling water jacket is on the catalyst housing and conveys cooling water alongside the catalyst housing. A flow disrupter disrupts flow of cooling water past the catalyst housing to the cooling water jacket on the exhaust manifold.

BRIEF DESCRIPTION OF THE DRAWINGS

Examples are described with reference to the following drawing figures. The same numbers are used throughout the figures to reference like features and components.

DETAILED DESCRIPTION OF THE DRAWINGS

Figure 1:
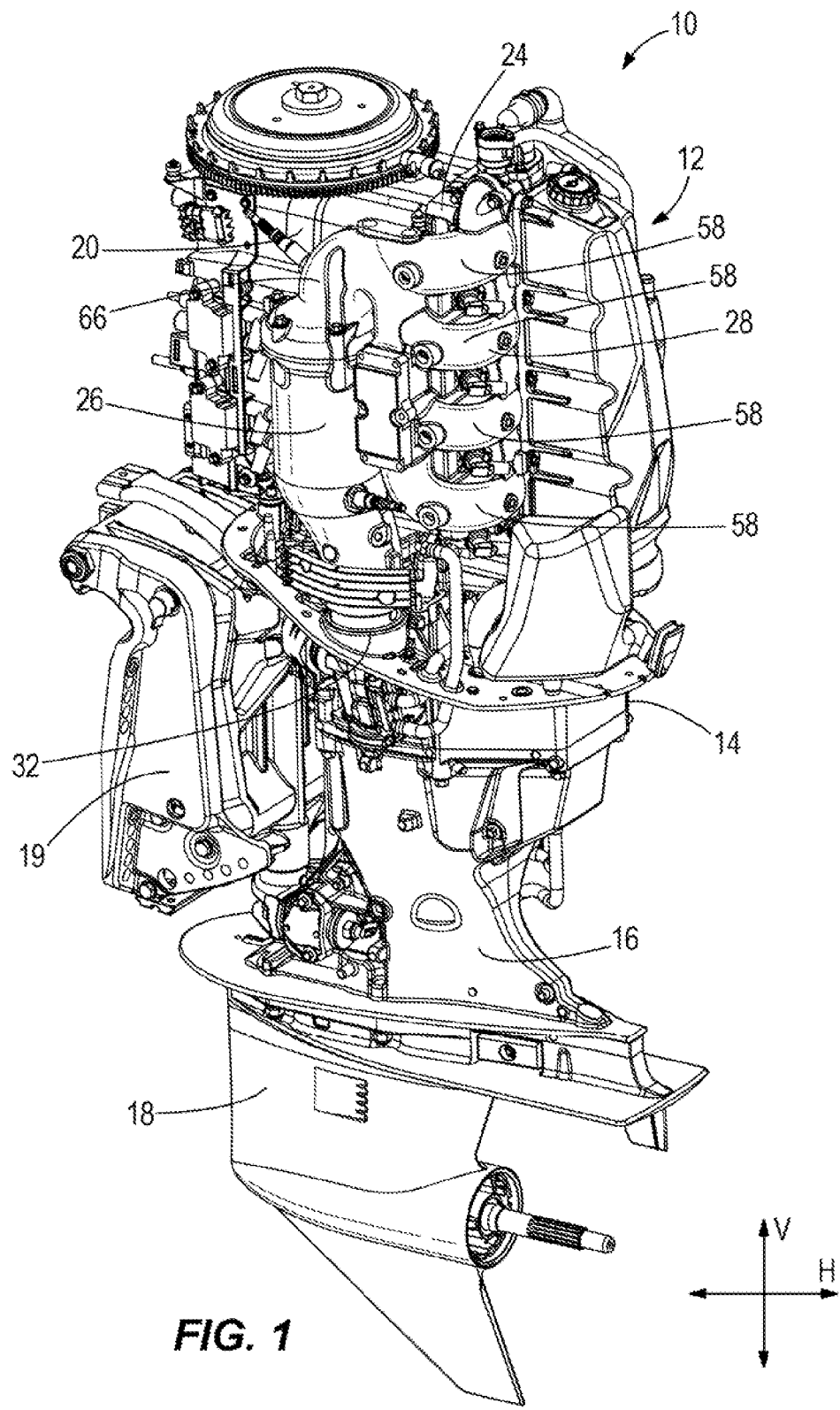
FIG. 1 is a perspective view of an outboard marine propulsion device having an engine, and upper cowl, an adapter plate, a driveshaft housing and a gearcase.

FIGS. 1-6 depict an outboard marine propulsion device 10 comprising, an internal combustion engine 12, an adapter plate 14, a driveshaft housing 16, and a gearcase 18. The configuration of the engine 12 can vary. In the example of FIG. 1, the internal combustion engine 12 is a four-stroke engine comprising a cylinder block 20 with a plurality of cylinders (e.g., four cylinders) 22 (FIG. 7), which are aligned in a substantially vertical direction V, and a cylinder head 24. Exhaust gases from the engine 12 are routed from the cylinder head 24 to a catalyst housing 26 by an exhaust manifold 28. The catalyst housing 26 contains at least one catalyst 30 that treats the exhaust gases. After passing through the catalyst housing 26, the exhaust gases flow into a lower exhaust pipe 32, which extends into the driveshaft housing 16. The outboard marine propulsion device 10 is mounted to a marine vessel by a transom mount assembly 19.

Figure 2:
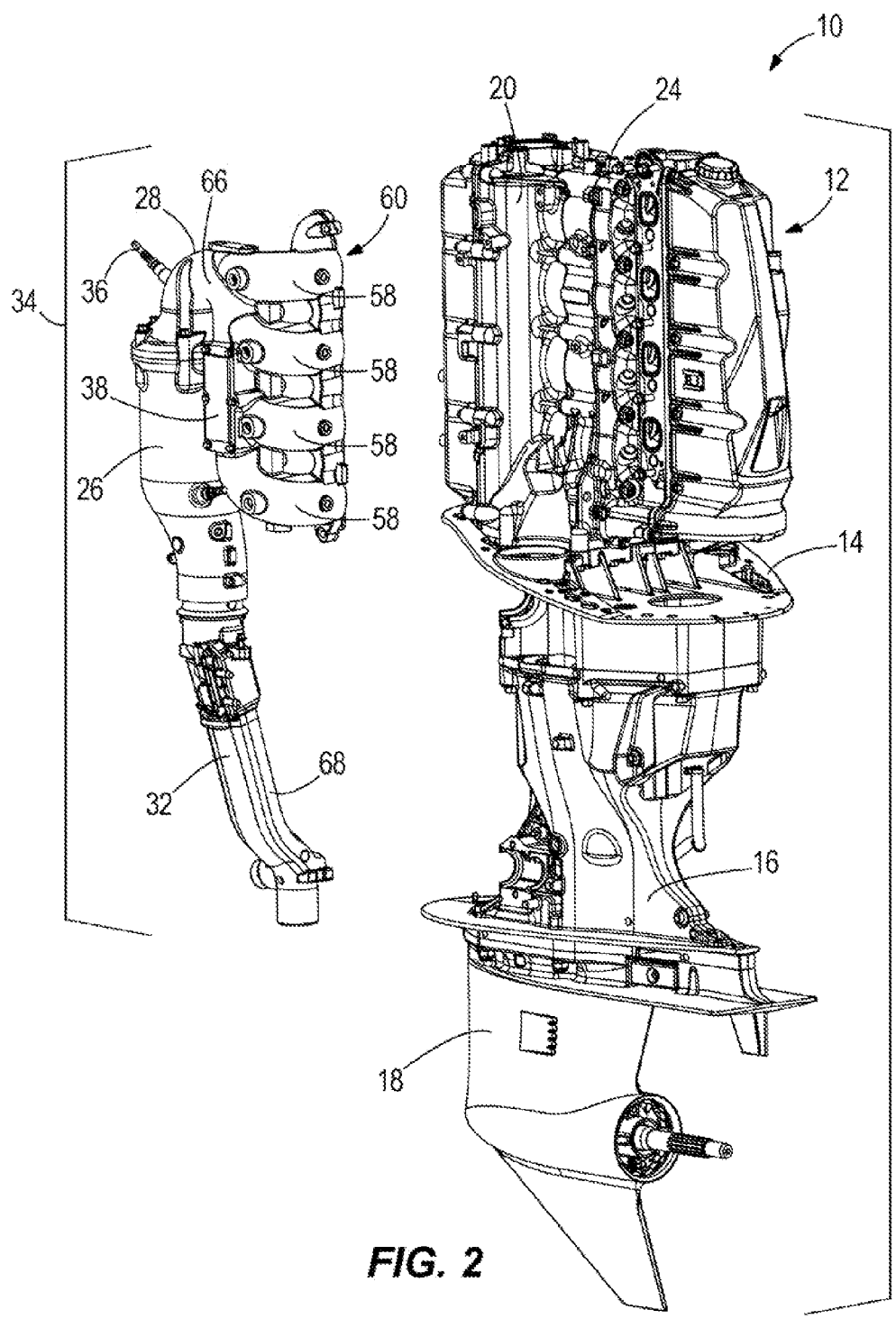
FIG. 2 is an exploded view of an outboard marine propulsion device having an exhaust system, which is shown separated from the engine.

FIG. 2 shows the exhaust system 34 separated from the engine 12. As shown, the exhaust system 34, including the exhaust manifold 28, catalyst housing 26 and lower exhaust pipe 32 may be removed from the engine 12. The exhaust system 34 comprises the exhaust manifold 28, the catalyst housing 26 and the lower exhaust pipe 32.

Figure 3:
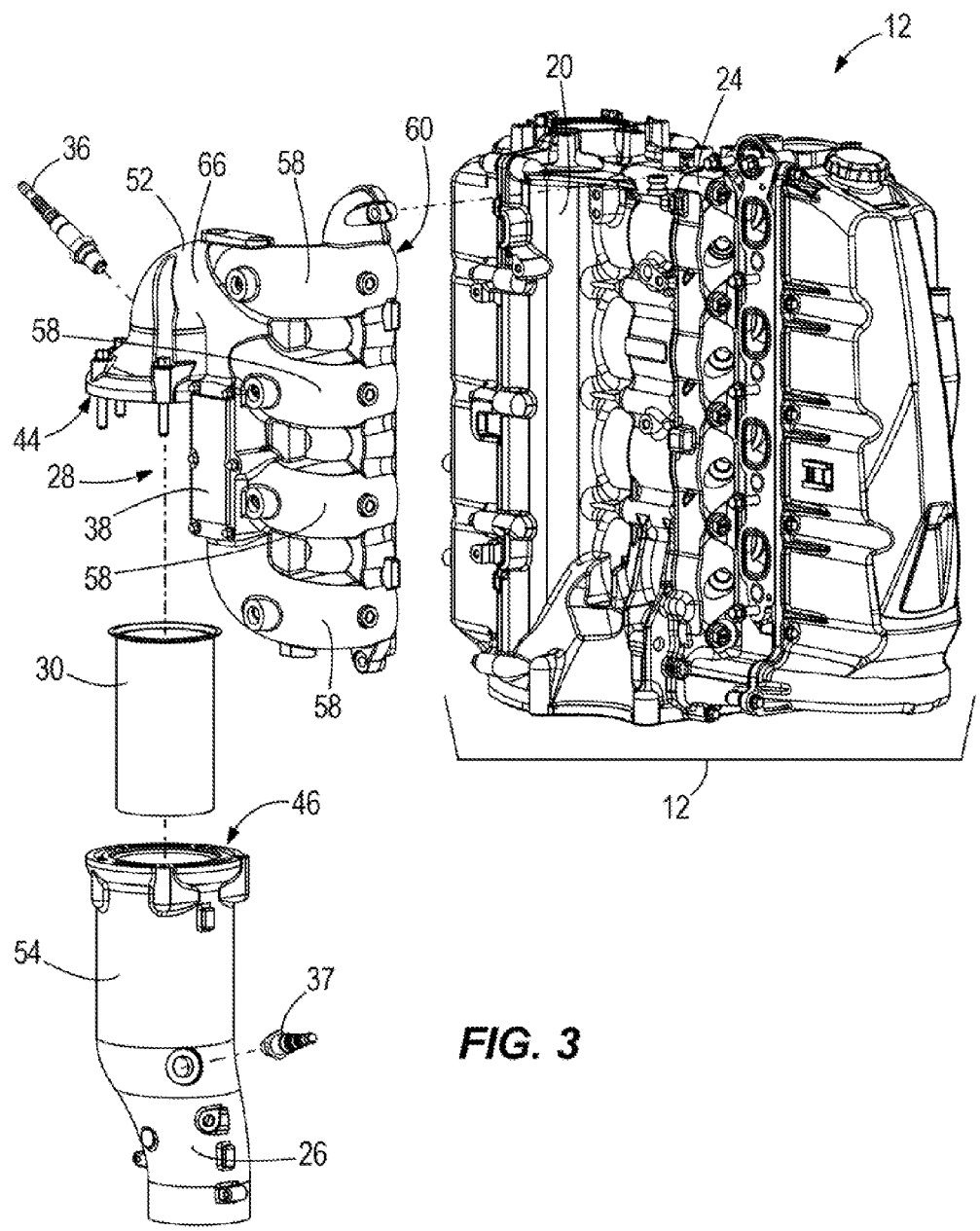
FIGS. 3 and 4 are exploded perspective views of an upper portion of the exhaust system of the outboard marine propulsion device.
Figure 4:
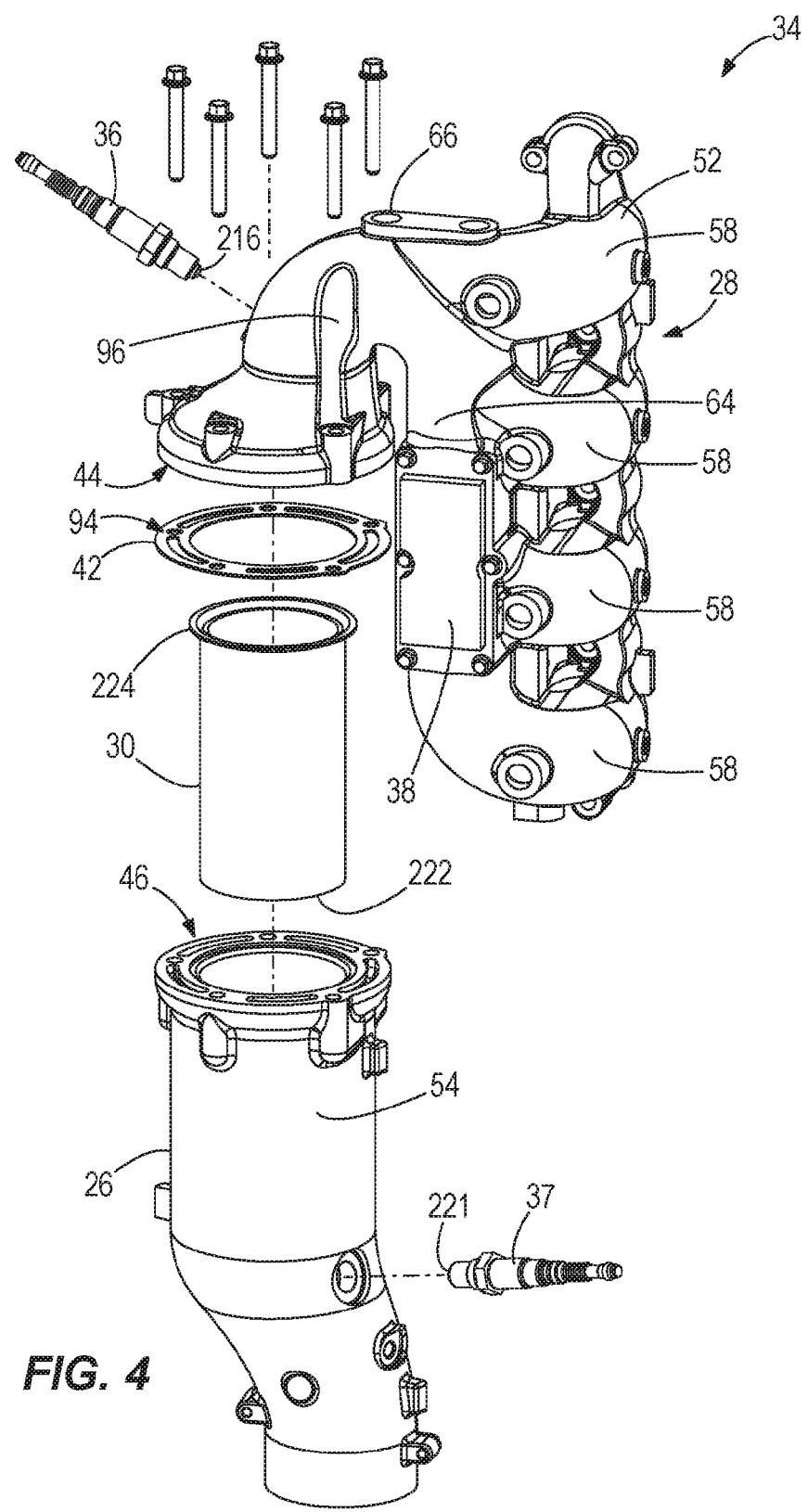

FIGS. 3 and 4 are exploded perspective views of an upper portion of the exhaust system 34. As noted above, the upper portion (i.e. the portion above the adapter plate) includes the exhaust manifold 28 and the catalyst housing 26, which includes at least one catalyst 30. The upper portion also includes a first gas concentration sensor 36 disposed upstream of the catalyst 30 (i.e. a pre-catalyst oxygen sensor) and second gas concentration sensor 37 disposed downstream of the catalyst 30 (i.e. a post-catalyst oxygen sensor). A voltage regulator 38 is attached to the outside of the exhaust manifold 28, in a position that puts it in thermal communication with cooling passages (to be explained further herein below) for cooling the exhaust manifold 28, thereby allowing the voltage regulator 38 to be cooled by cooling water flowing through the cooling passages. As shown in FIG. 4, a gasket 42 may be positioned between the connecting surfaces 44, 46 of the exhaust manifold 28 and the catalyst housing 26 to provide a seal therebetween. The gasket 42 is shown in greater detail in FIG. 20 and is also discussed in greater detail in connection with FIG. 20.

Figure 5:
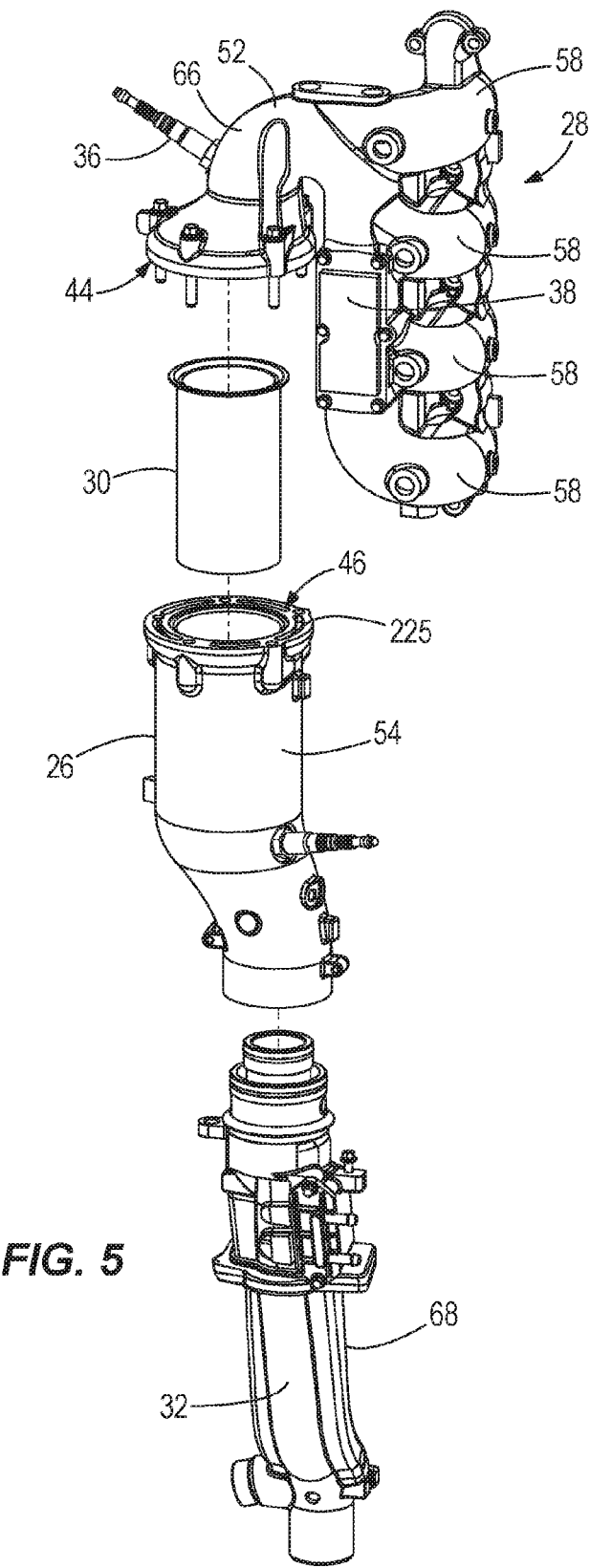
FIG. 5 is an exploded perspective view of the exhaust system.

FIG. 5 is an exploded perspective view of the exhaust system 34, including the exhaust manifold 28, catalyst 30, the catalyst housing 26, and the lower exhaust pipe 32.

Figure 6:
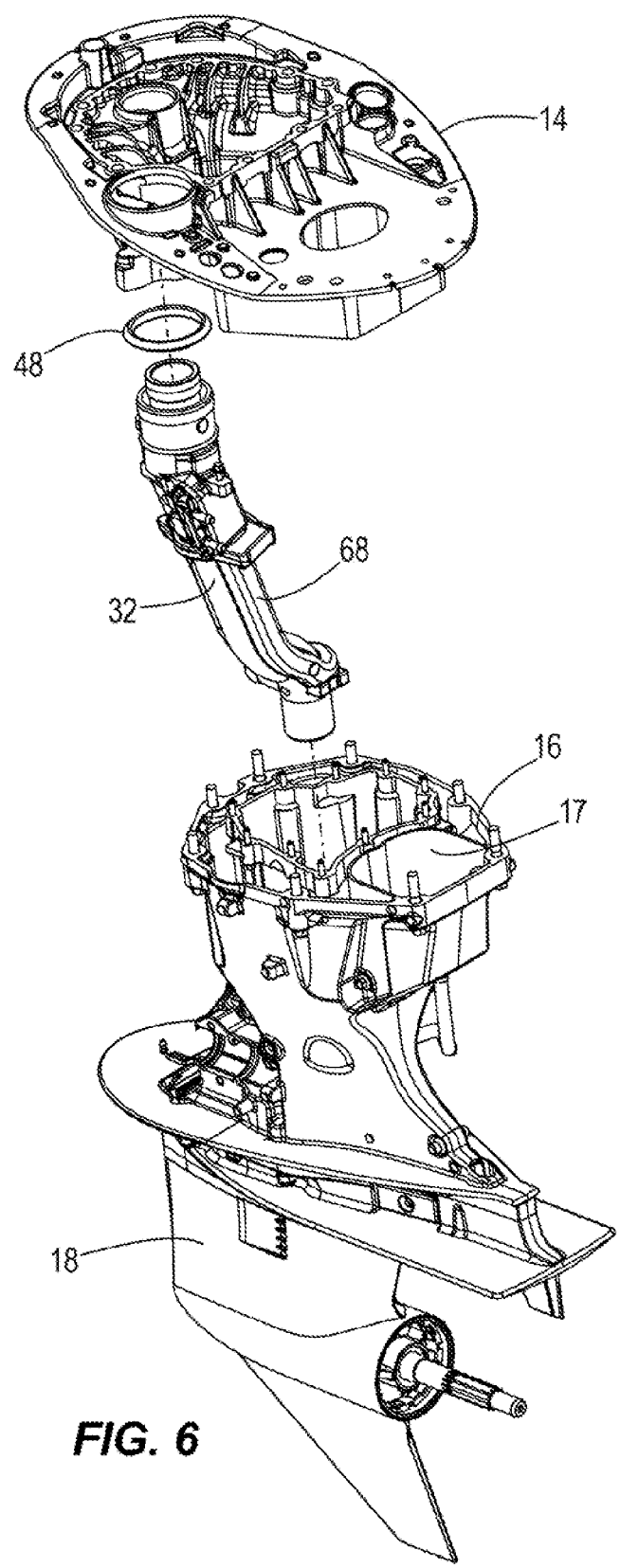
FIG. 6 is an exploded view of a lower portion of the outboard marine propulsion device.

FIG. 6 is an exploded view of a lower portion of the outboard marine propulsion device 10, including the adapter plate 14, an isolator/seal 48, the lower exhaust pipe 32, the driveshaft housing 16, an oil sump 17 in the driveshaft housing 16, and the gearcase 18. The isolator/seal 48 is provided between the adapter plate 14 and the lower exhaust pipe 32. During assembly, the lower exhaust pipe 32 is inserted into the driveshaft housing 16.

Figure 7:
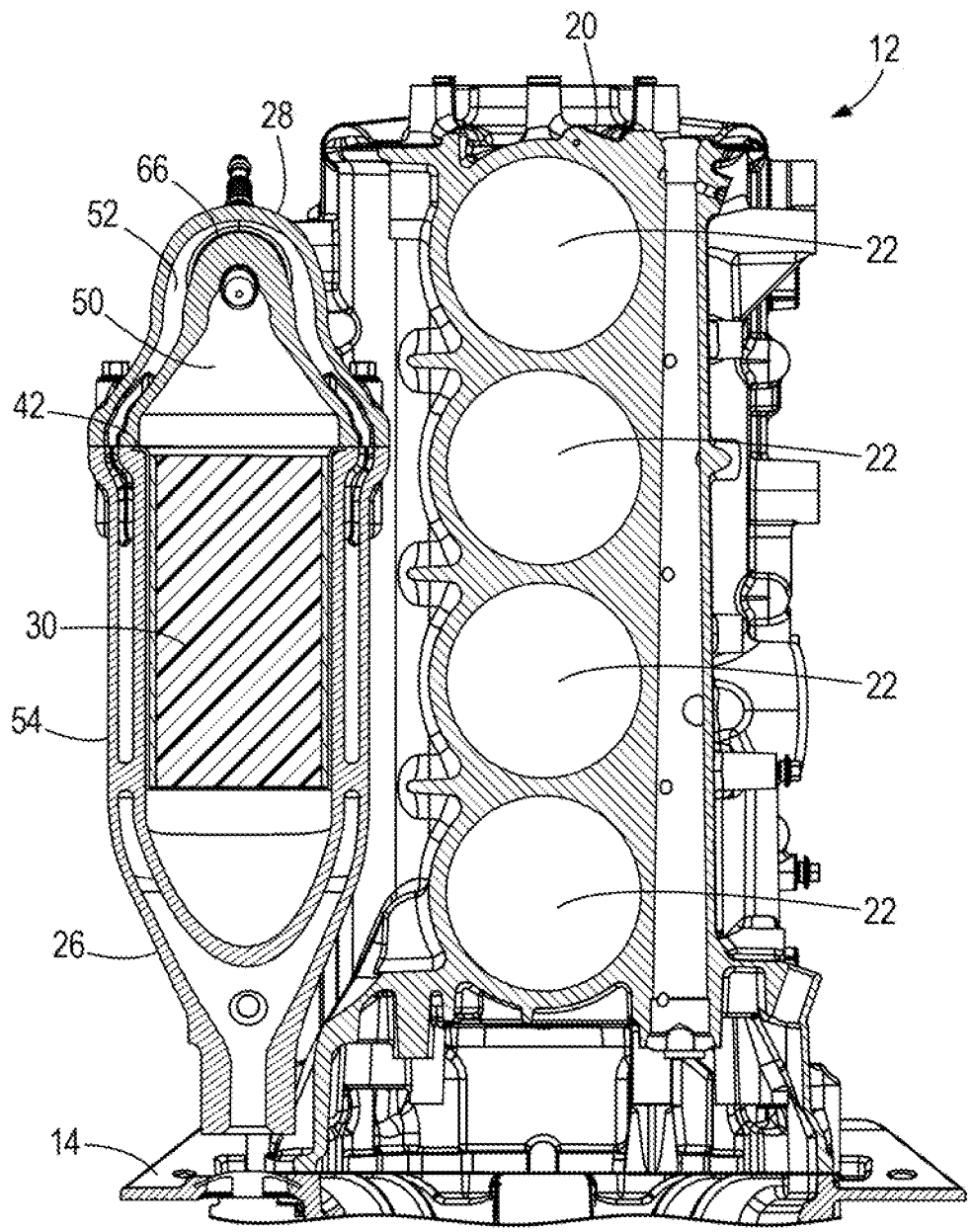
FIGS. 7 and 8 are different cross-sectional views of an upper portion of the outboard marine propulsion device.
Figure 8:
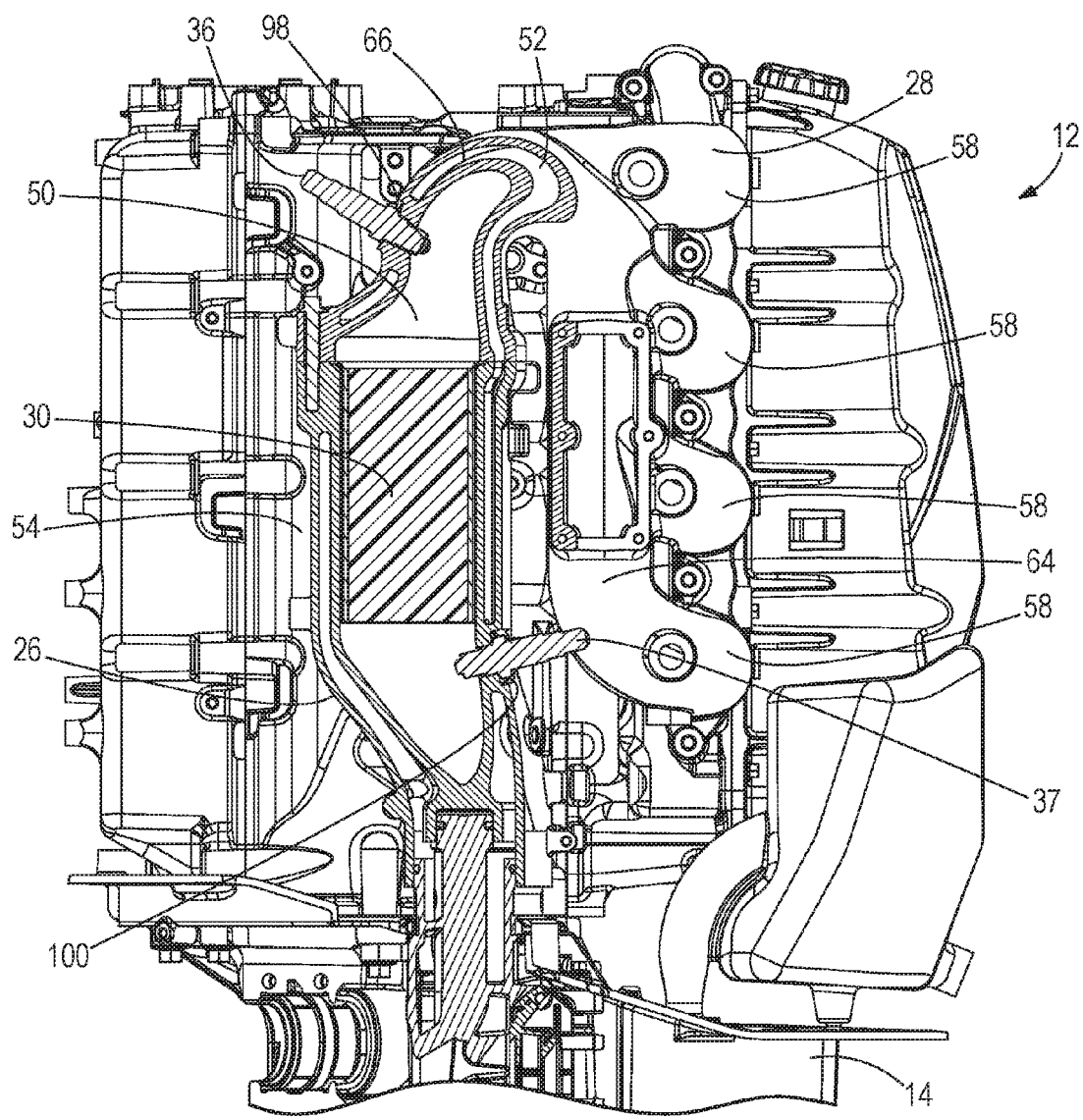

FIGS. 7 and 8 are different cross sectional views of an upper portion of the outboard marine propulsion device 10, the sections being taken along different vertical planes, showing the cylinder block 20, the exhaust manifold 28, the gasket 42, the catalyst housing 26, the catalyst 30 and the adapter plate 14. Included in the exhaust manifold 28 is an exhaust passage 50 through which the exhaust gases flow. As shown in FIGS. 7 and 8, a cooling water jacket 52 is disposed on the exhaust manifold 28 and a cooling water jacket 54 is disposed on the catalyst housing 26, substantially surrounding the exhaust passage 50 and the catalyst 30. The cooling water jackets 52, 54 direct cooling water around and in thermal communication with the exhaust passage 50 and the catalyst housing 26 to cool the exhaust gases and the catalyst 30.

Figure 9:
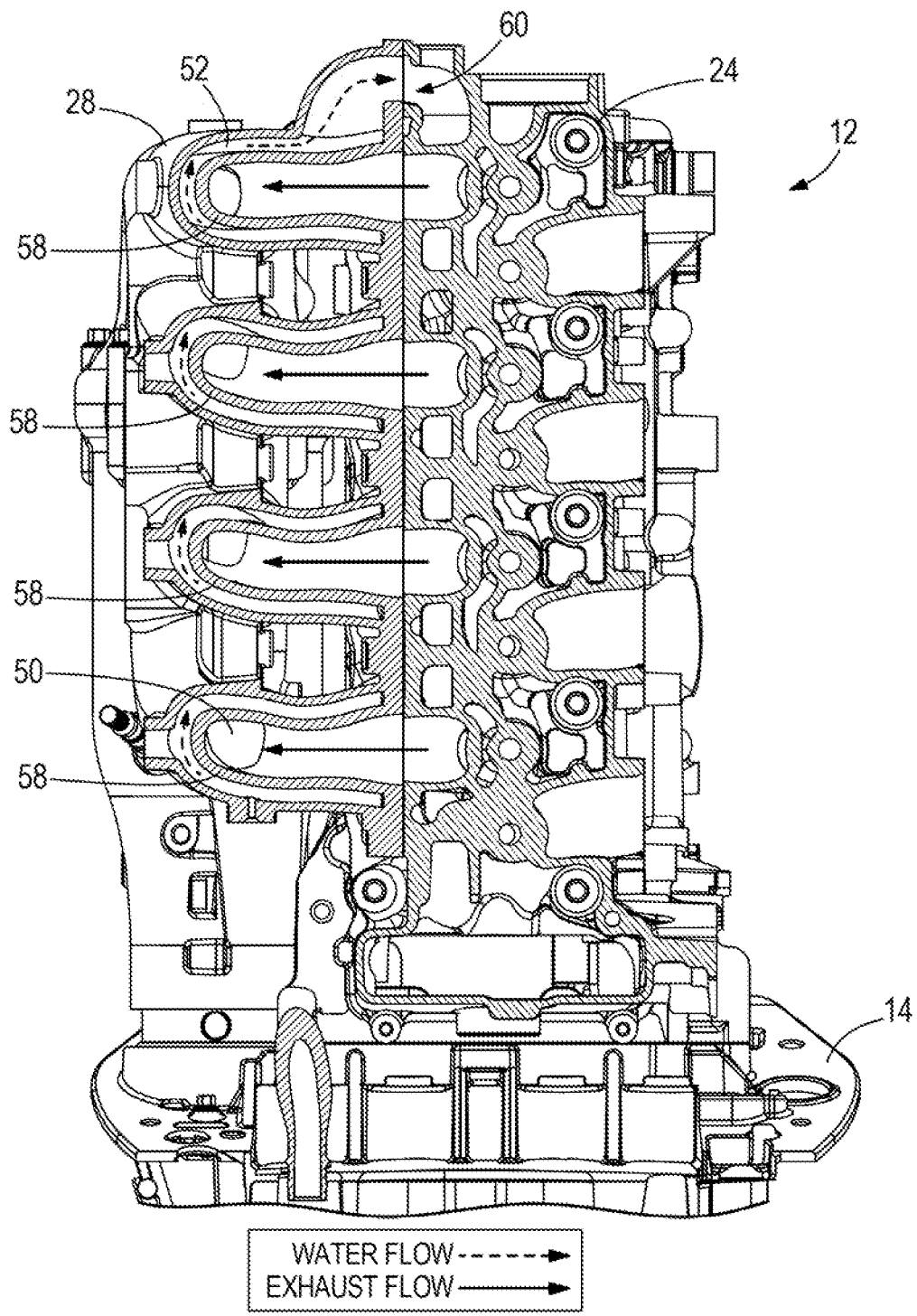
FIG. 9 is a cross-sectional view of an upper portion of the outboard marine propulsion device, wherein the section is taken along a vertical plane.

FIG. 9 is a cross sectional view of an upper portion of the engine 12, the section being taken along a vertical plane. In FIG. 9, the path of exhaust gas flow through the engine 12 is shown with solid arrows, while the path of cooling water flow is shown with dashed arrows. Exhaust gases flow from piston/cylinders in the cylinder head 24, which correspond to the plurality of cylinders 22 into inlet runners 58 on the exhaust manifold 28, where the exhaust gases are guided by the exhaust passage 50. Cooling water flows through the cooling water jackets 52, 54 around the exhaust manifold inlet runners 58, working in a generally upward direction, from the lowermost exhaust manifold inlet runners 58 to the upper most exhaust manifold inlet runners 58. A joint 60 between the cooling water jacket 52 and a cooling passage 62 in the cylinder head 24 is at substantially the highest point in the cooling water system, so that any air trapped in the system will go through this joint.

Figure 10:
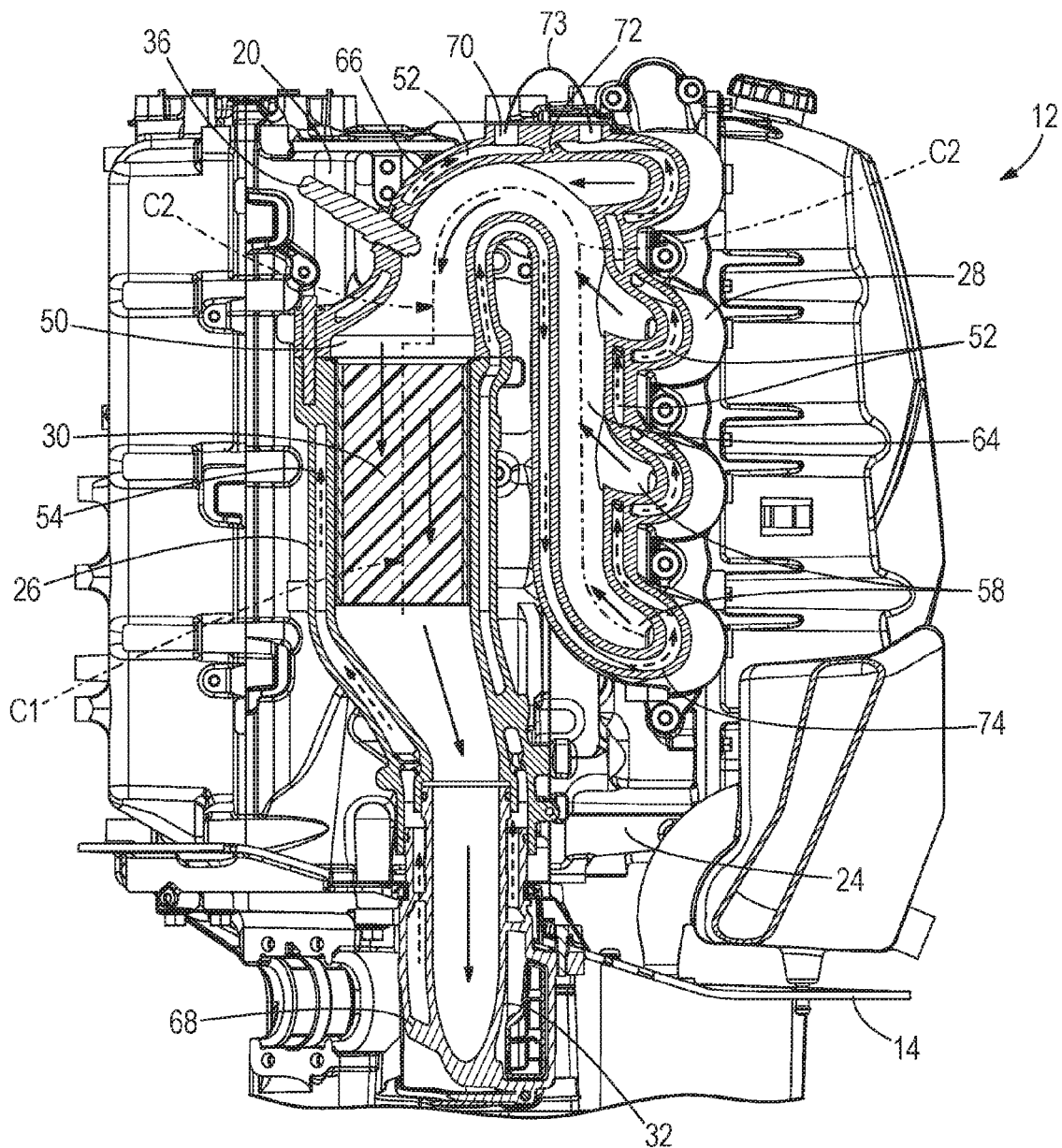
FIG. 10 is a cross-sectional view of the outboard marine propulsion device, the section taken along a vertical plane.

FIG. 10 is another cross sectional view of the engine 12, the section being taken along a vertical plane. The path of exhaust gas flow through the engine 12 is again shown with solid arrows, while the path of coolant water flow is shown with dashed arrows. As shown, exhaust gases flow from the exhaust manifold inlet runners 58 into a collecting exhaust passage 64, where it is then guided through a bend 66, into a generally downward direction of flow, toward the catalyst 30. The collecting exhaust passage 64 is substantially vertically oriented, and the catalyst housing 26 is substantially parallel thereto, such that exhaust gases from the lower most exhaust manifold inlet runners 58 flow generally upward in the collecting exhaust passage 64, makes a 180 degree turn in the bend 66, and then flows generally downward through the catalyst housing 26 (and catalyst 30), into the lower exhaust pipe 32. A centerline C1 of the catalyst 30 (and catalyst housing 26) is offset from a centerline C2 of the exhaust passage 50 in order to promote even distribution of exhaust gasses across the catalyst 30. Exhaust gas flow tends to "hug" the outside surface of the exhaust passage 50, such that if the catalyst 30 were in line with the exhaust passage 50 (rather than offset), a majority of the exhaust gases would pass through only an outside portion of the catalyst 30, resulting in uneven degradation (wear) of the catalyst 30. This offset helps to ensure that the catalyst 30 is used more evenly (for utilization efficiency) and degrades (wears) more evenly, thereby prolonging its life.

As shown in FIG. 10, the cooling water flows up from the driveshaft housing 16 through a cooling water jacket 68 disposed on the lower exhaust pipe 32. From the cooling water jacket 68, cooling water continues to flow in a generally upward direction through the cooling water jacket 54 on the catalyst housing 26 and to the cooling water jacket 52 on the exhaust manifold 28. In the cooling water jacket 52 on the exhaust manifold 28, the cooling water flows through passages surrounding the collecting exhaust passage 64, bend 66, and the exhaust manifold inlet runners 58. In this manner, substantially all portions of the exhaust system 34 (e.g., the exhaust manifold 28, the catalyst housing 26, and the lower exhaust pipe 32) are effectively cooled.

As shown in FIG. 10, there is a first small opening 70 in the top of the cooling water jacket 52 on the exhaust manifold 28 at the bend 66 and a second small opening 72 in the top of the cooling water jacket 52 at the exhaust manifold inlet runners 58 to allow air to bleed out of the system. It can be desirable to include a "jumper" 73 connecting these two openings and allowing any air trapped in the respective cooling passages to bleed out. In the alternative, an orifice at the highest point of the cooling water jacket 52 on the exhaust manifold 28, connecting the noted cooling passages may perform the same function.

Further, it may be desirable to include a small drain hole 74 at the lowest point of the cooling water jacket 52 on the exhaust manifold 28 to allow any cooling water to drain out of the cooling water jacket 52 when the engine 12 is not in use. If water is trapped in the system and freezes in cold weather, it can cause significant and costly engine problems. The small drain hole 74 may allow water to drain back to the cylinder head 24, to somewhere else on the engine 12, or may be connected to a hose that directs the water outside the engine 12. As shown, the cooling water makes three passes along the exhaust manifold 28 helping to promote maximum cooling of the exhaust gases passing therethrough.

Figure 11:
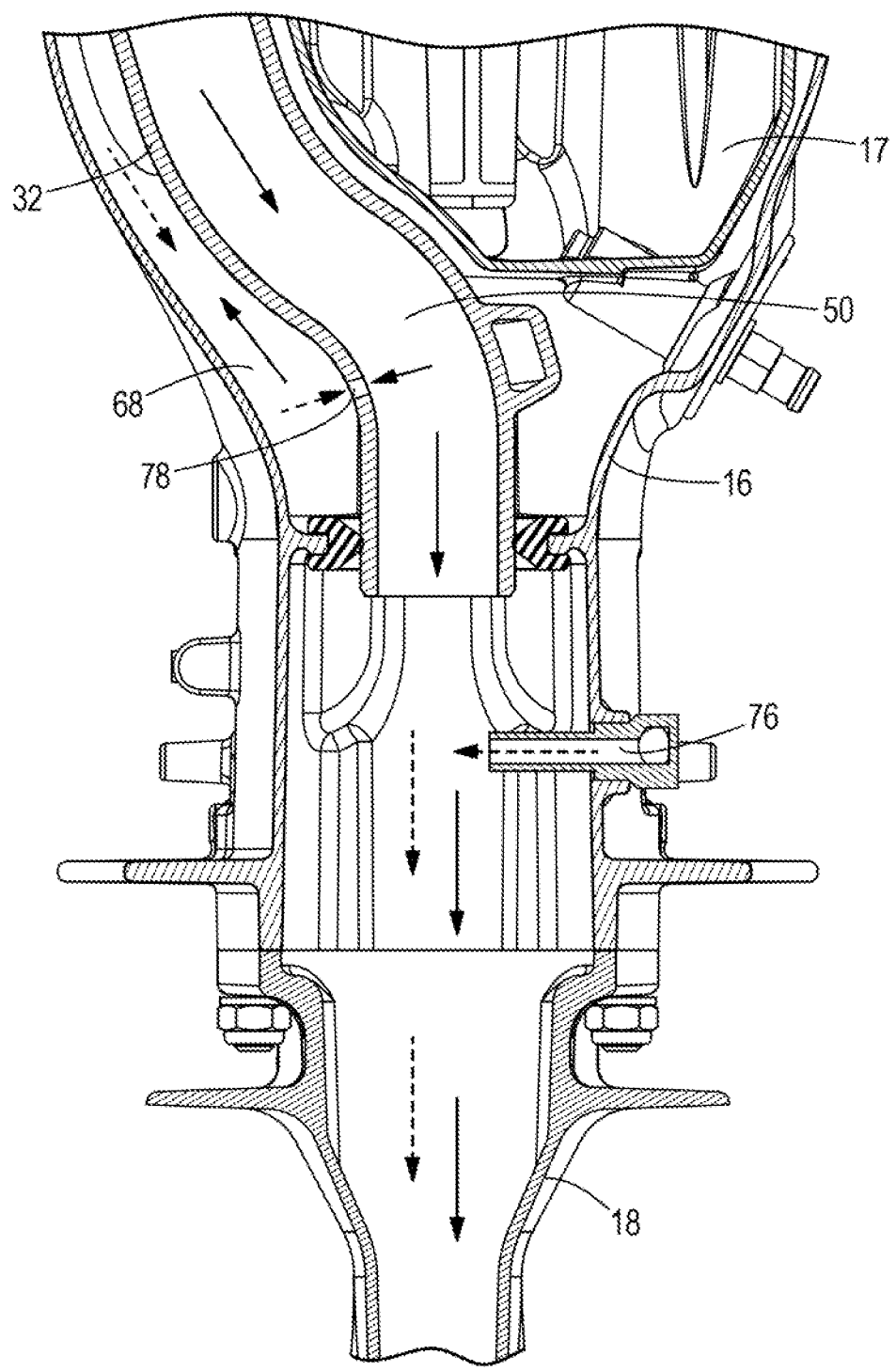
FIG. 11 is a cross-sectional view of a lower portion of the outboard marine propulsion device, showing the gearcase and the driveshaft housing, the section taken along a vertical plane.

FIG. 11 is a cross sectional view of the lower portion of the outboard marine propulsion device 10 showing the gearcase 18 and the driveshaft housing 16, wherein the section is taken along a vertical plane. As in previous Figures, the flow of exhaust gases is shown with solid arrows, while the flow of cooling water is shown with dashed arrows. As shown, exhaust gases generally flow in a downward direction through the lower exhaust pipe 32 and into the gearcase 18. The gearcase 18 includes a water sprayer 76 that injects water into the exhaust gases flowing out of the bottom of the lower exhaust pipe 32, further cooling the exhaust gases before exiting the outboard marine propulsion device 10. The lower exhaust pipe 32 includes an idle relief passage 78 that allows for communication between the cooling water jacket 68 on the lower exhaust pipe 32 and the lower exhaust passage 50. Depending on the mode of operation of the engine 12, cooling water may flow into the lower exhaust passage 50 or exhaust gases may flow out of the lower exhaust passage 50 (or a combination thereof).

Figure 12:
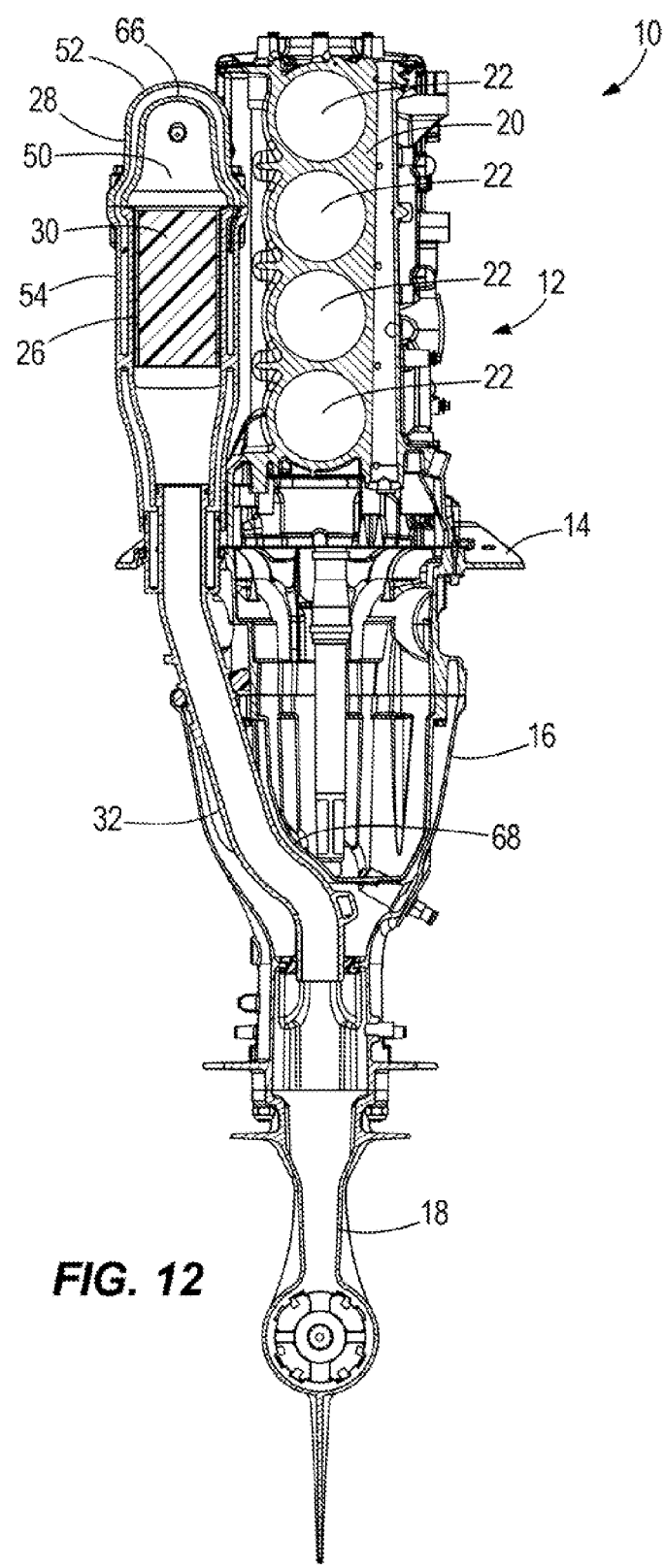
FIG. 12 is a cross-sectional view of the outboard marine propulsion device, wherein the section is taken along multiple vertical planes.
Figure 13:
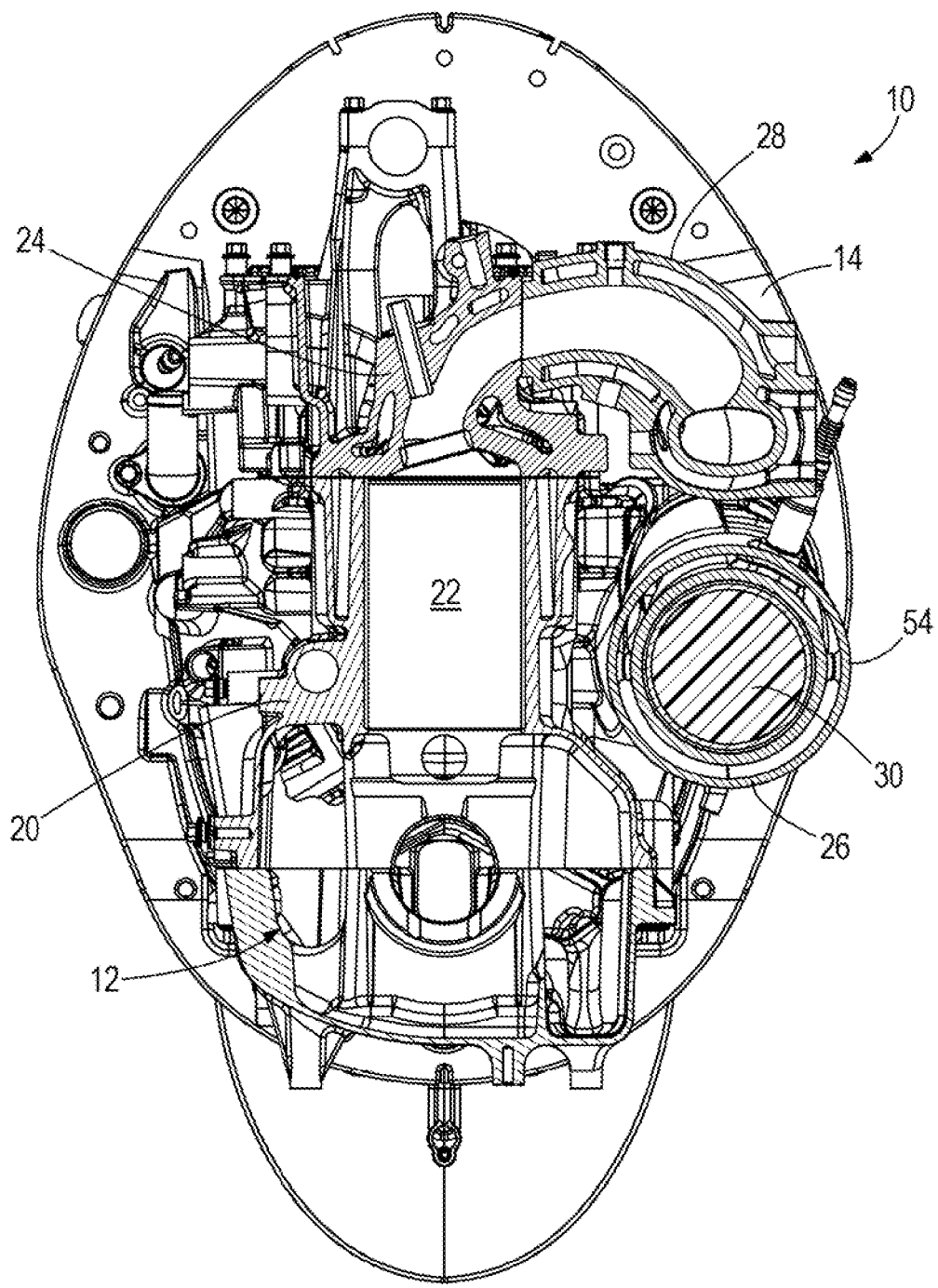
FIGS. 13 and 14 are cross-sectional top views of the outboard marine propulsion device, wherein the sections are taken along horizontal planes at different heights.
Figure 14:
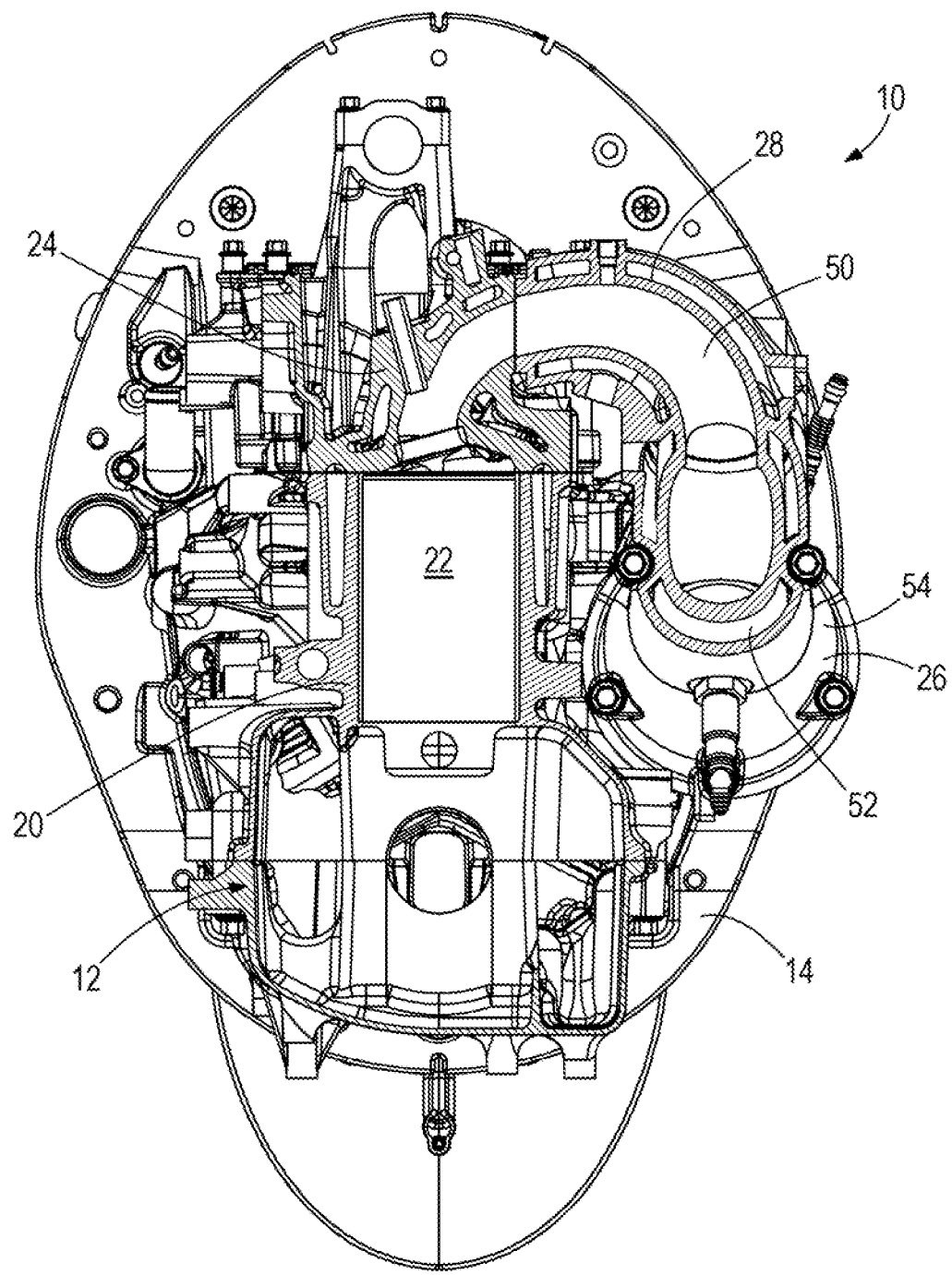

FIG. 12 is a cross sectional view of the engine 12, where the section is taken along multiple vertical planes so that a substantial portion of the exhaust system can be seen. FIGS. 13 and 14 are cross sectional top views of the engine 12, with sections being taken along horizontal planes at different heights. The section plane of FIG. 13 is at a height that cuts through the catalyst housing 26, catalyst 30, and cylinders 22 whereas the section plane of FIG. 14 is higher, so the top of the catalyst housing 26 is visible and the exhaust passage of the topmost cylinder 22 is sectioned.

Figure 15:
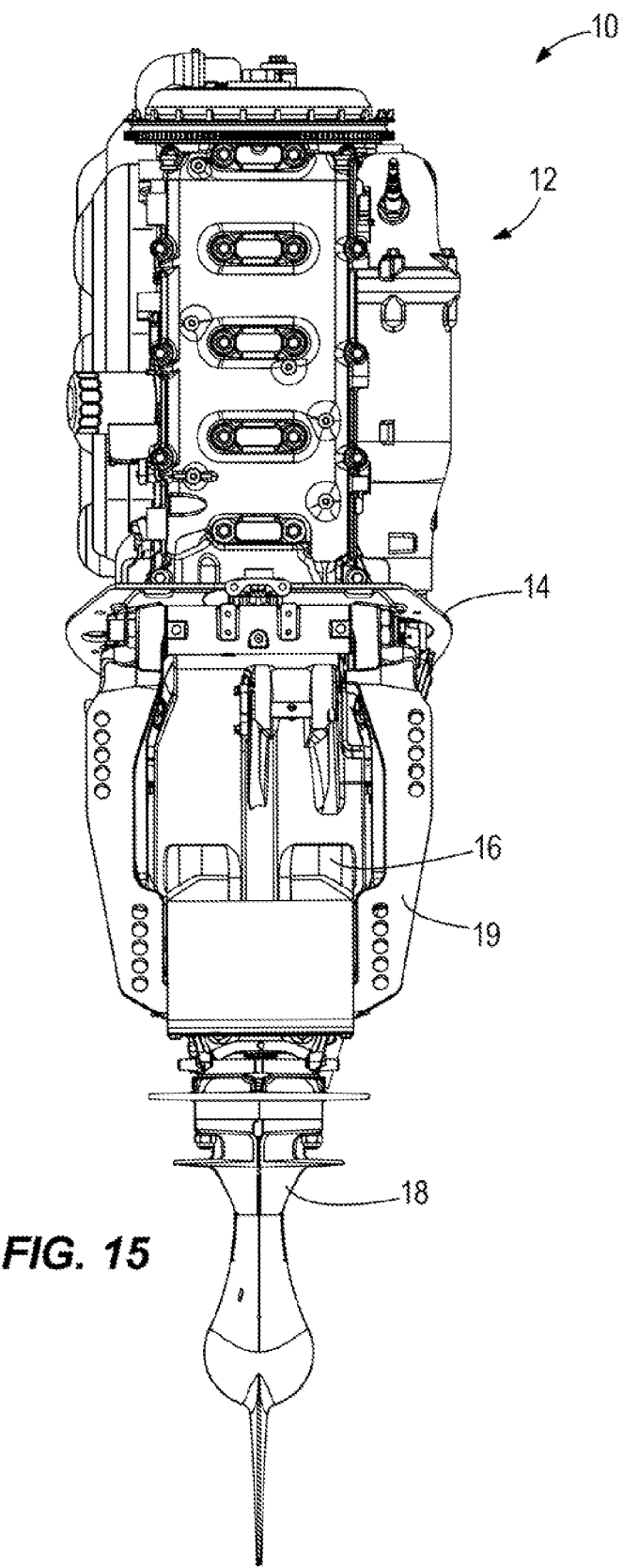
FIG. 15 is a front view of the outboard marine propulsion device.
Figure 16:
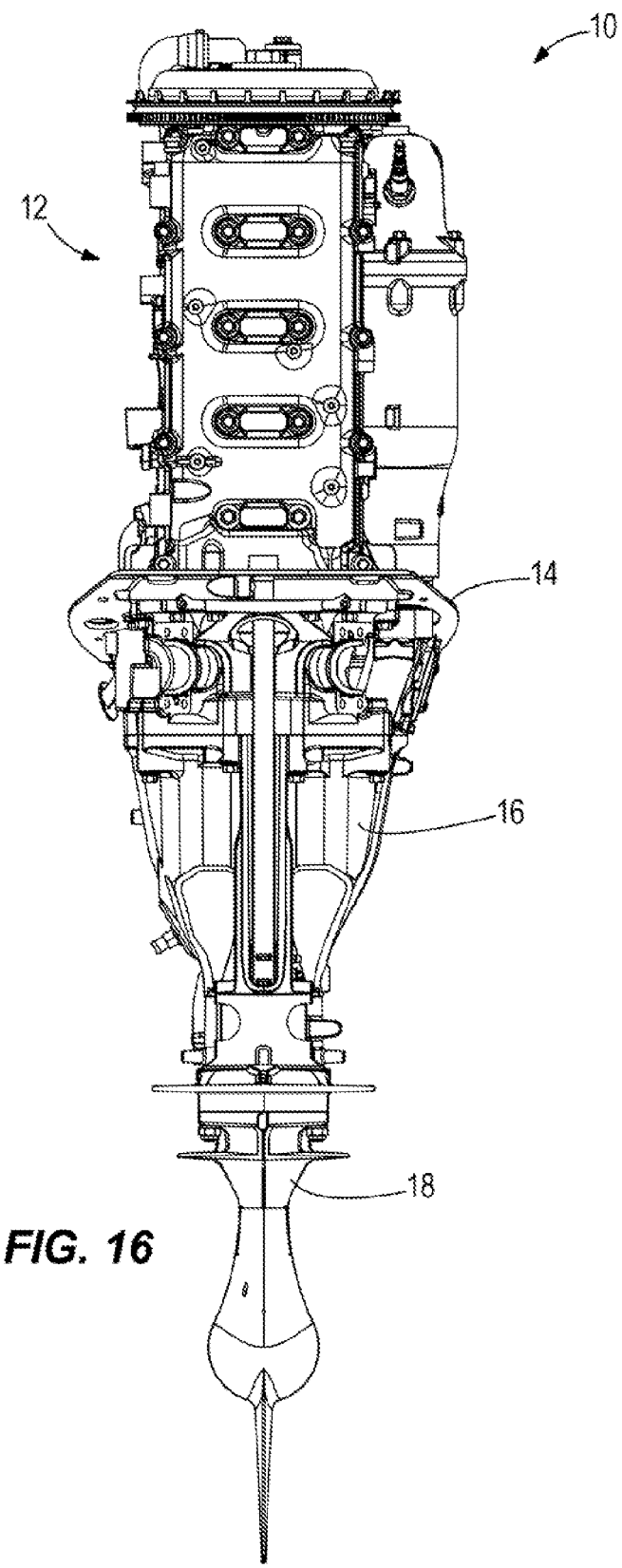
FIG. 16 is a front view of the outboard marine propulsion device
Figure 17:
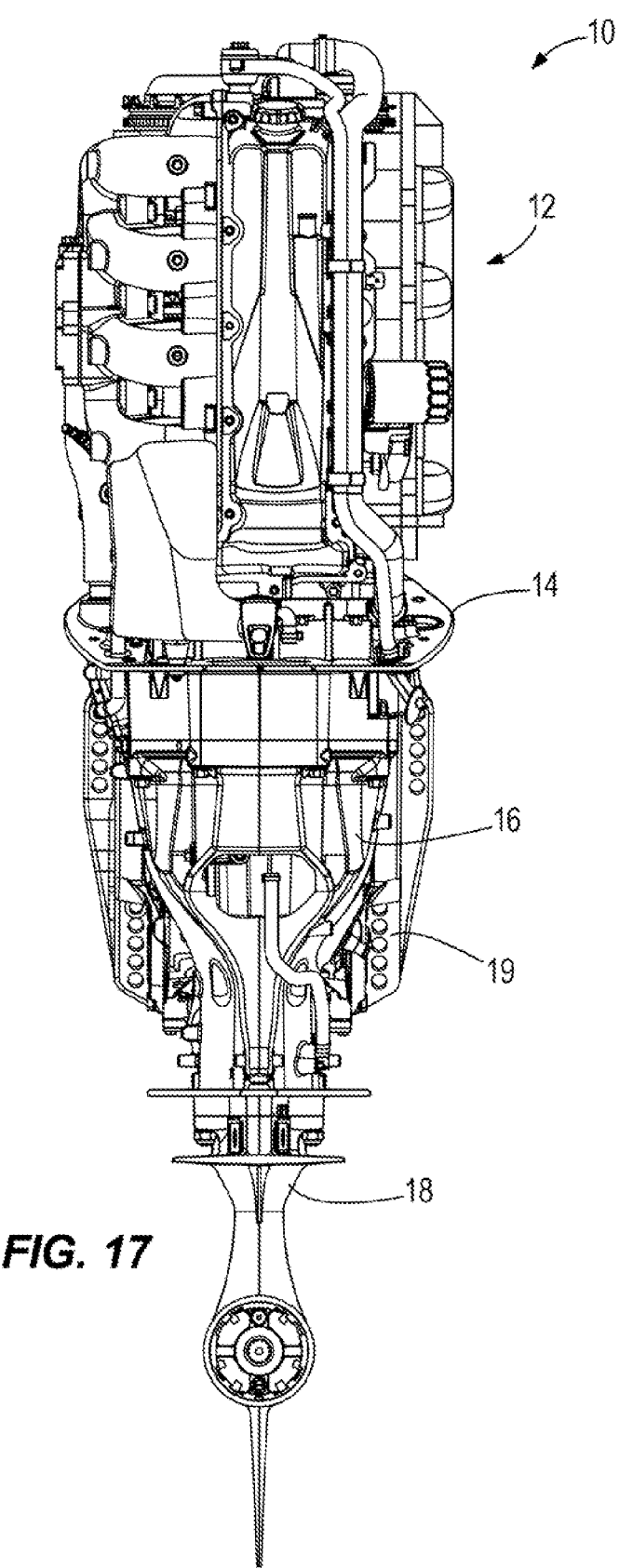
FIG. 17 is a rear view of the outboard marine propulsion device.
Figure 18:
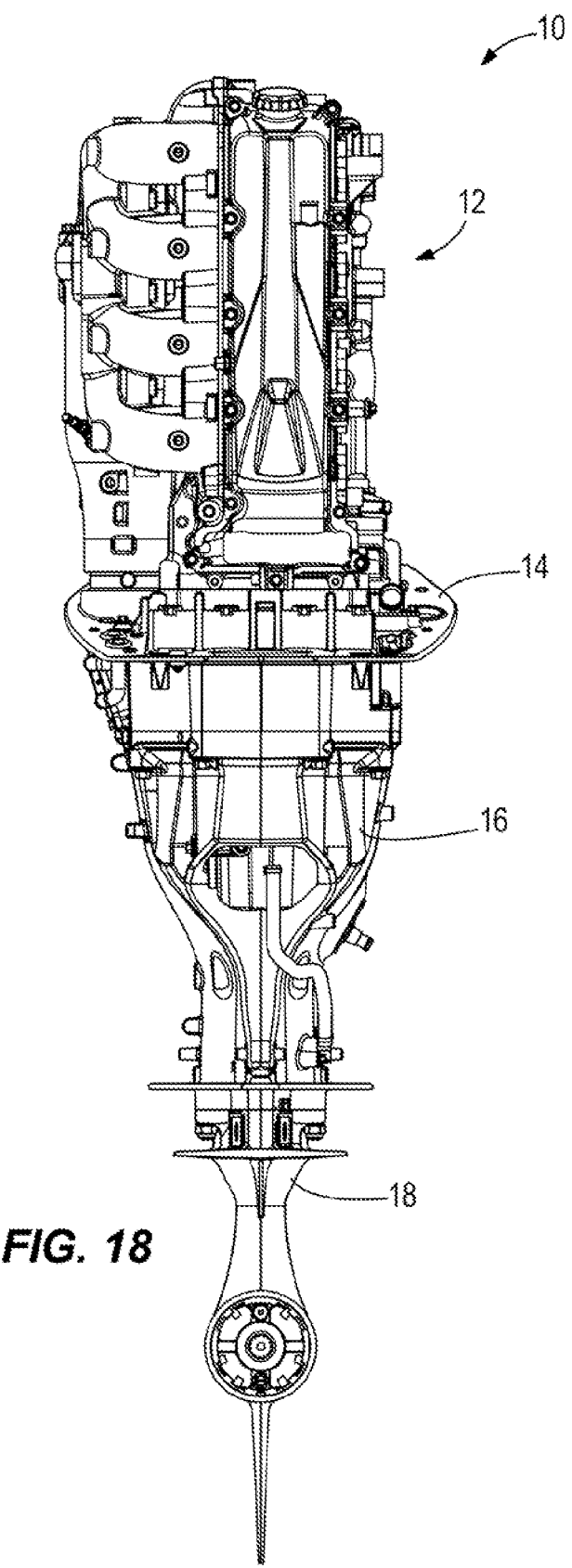
FIG. 18 is also a rear view of the outboard marine propulsion device with several peripheral components and assemblies removed.
Figure 19:
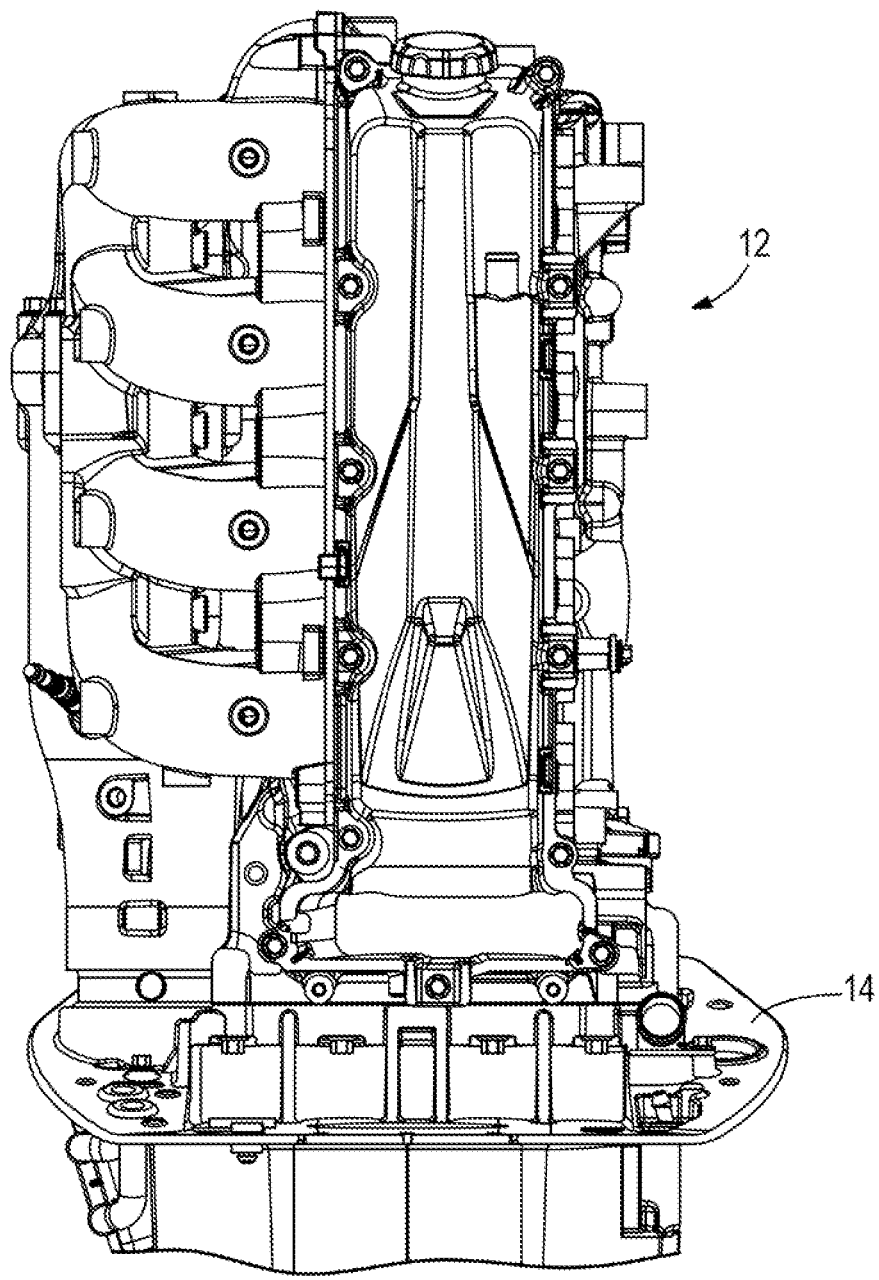
FIG. 19 is a rear view of an upper portion of the outboard marine propulsion device with several peripheral components and assemblies removed.

FIG. 15 is a front view of the outboard marine propulsion device 10. FIG. 16 is also a front view of the outboard marine propulsion device 10 with several peripheral components and assemblies removed. FIG. 17 is a rear view of the outboard marine propulsion device 10. FIG. 18 is also a rear view of the outboard marine propulsion device 10 with several peripheral components and assemblies removed. FIG. 19 is a rear view of an upper portion of the outboard marine propulsion device 10 with several peripheral components and assemblies removed.

Figure 20:
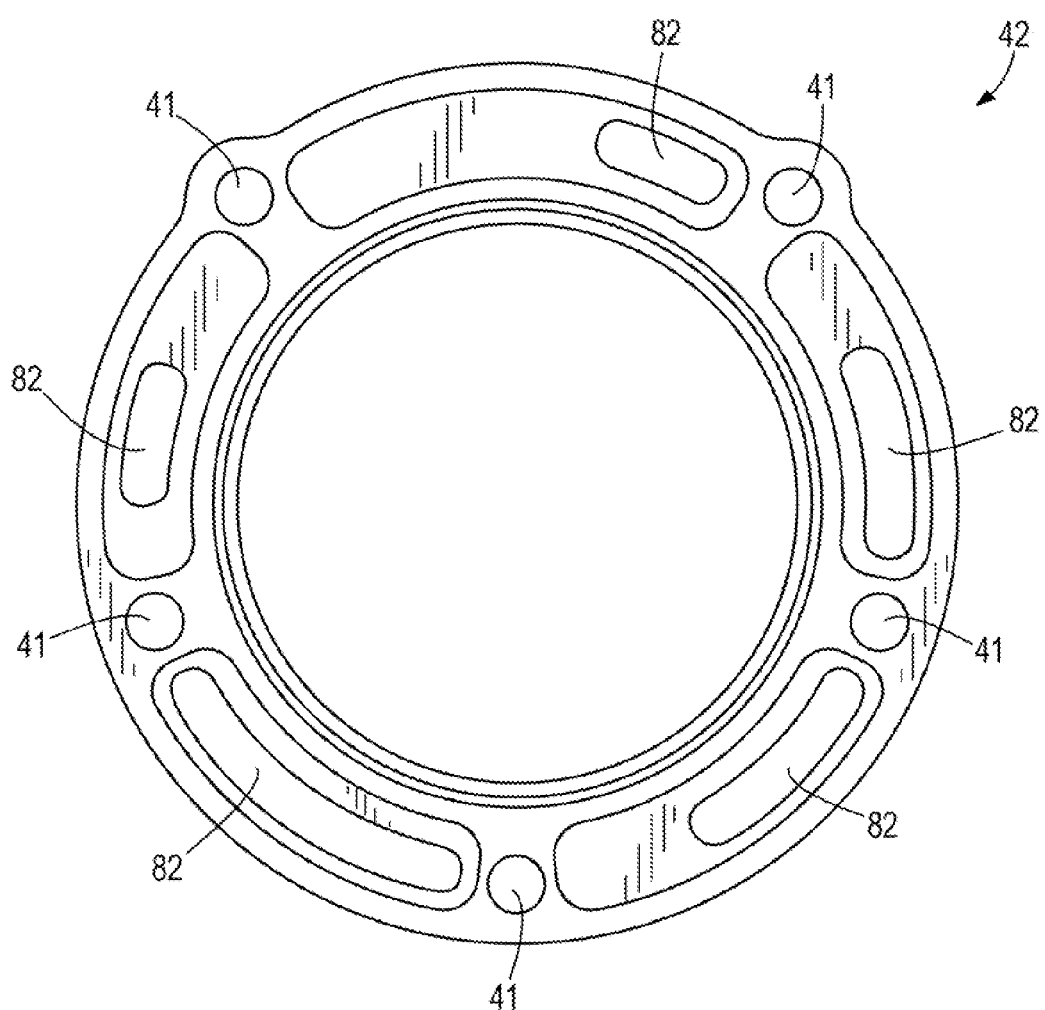
FIG. 20 is a top view of the gasket disposed between the exhaust manifold and the catalyst housing.

FIG. 20 is a top view of the gasket 42 disposed between the exhaust manifold 28 and the catalyst housing 26. A plurality of bolt holes 41 are spaced around the gasket 42 for receiving bolts that secure the gasket 42 in place. In addition to providing a seal between the exhaust manifold 28 and the catalyst housing 26, the gasket 42 can operate as a spring that applies force to the catalyst 30, thereby helping to secure the catalyst 30 in place. The gasket 42 also has several, differently sized holes 82 that are sized and spaced to direct flow of cooling water from the cooling water jacket 54 on the catalyst housing 26 to the cooling water jacket 52 on the exhaust manifold 28. The restriction provided by the gasket 42 forces cooling water toward regions of the cooling passages that may otherwise not get sufficient flow of cooling water. Further discussion of this figure is provided herein below.

Figure 21:
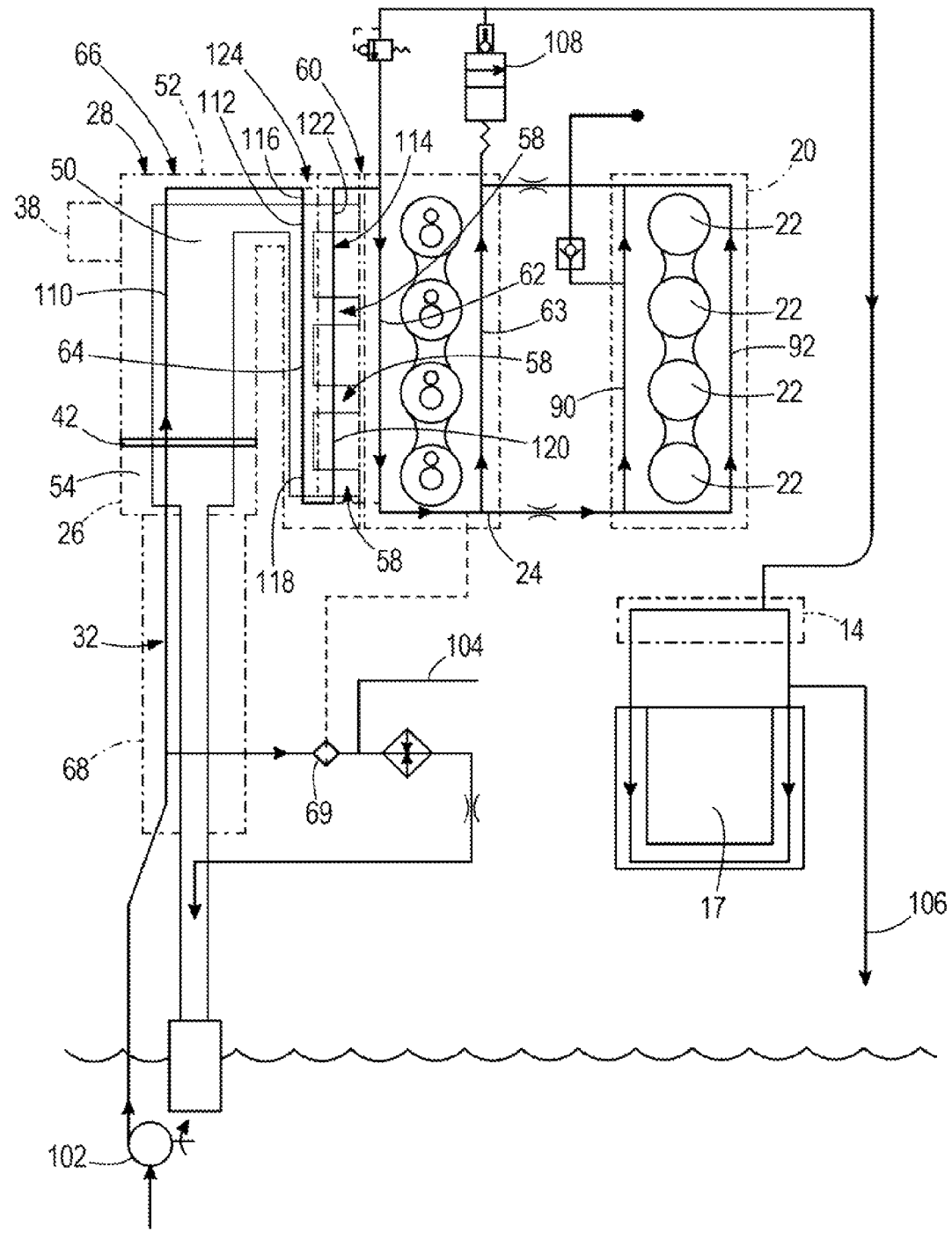
FIGS. 21 and 22 are schematics of example cooling systems for the outboard marine propulsion device, wherein the cooling water makes three passes through the exhaust manifold.
Figure 22:
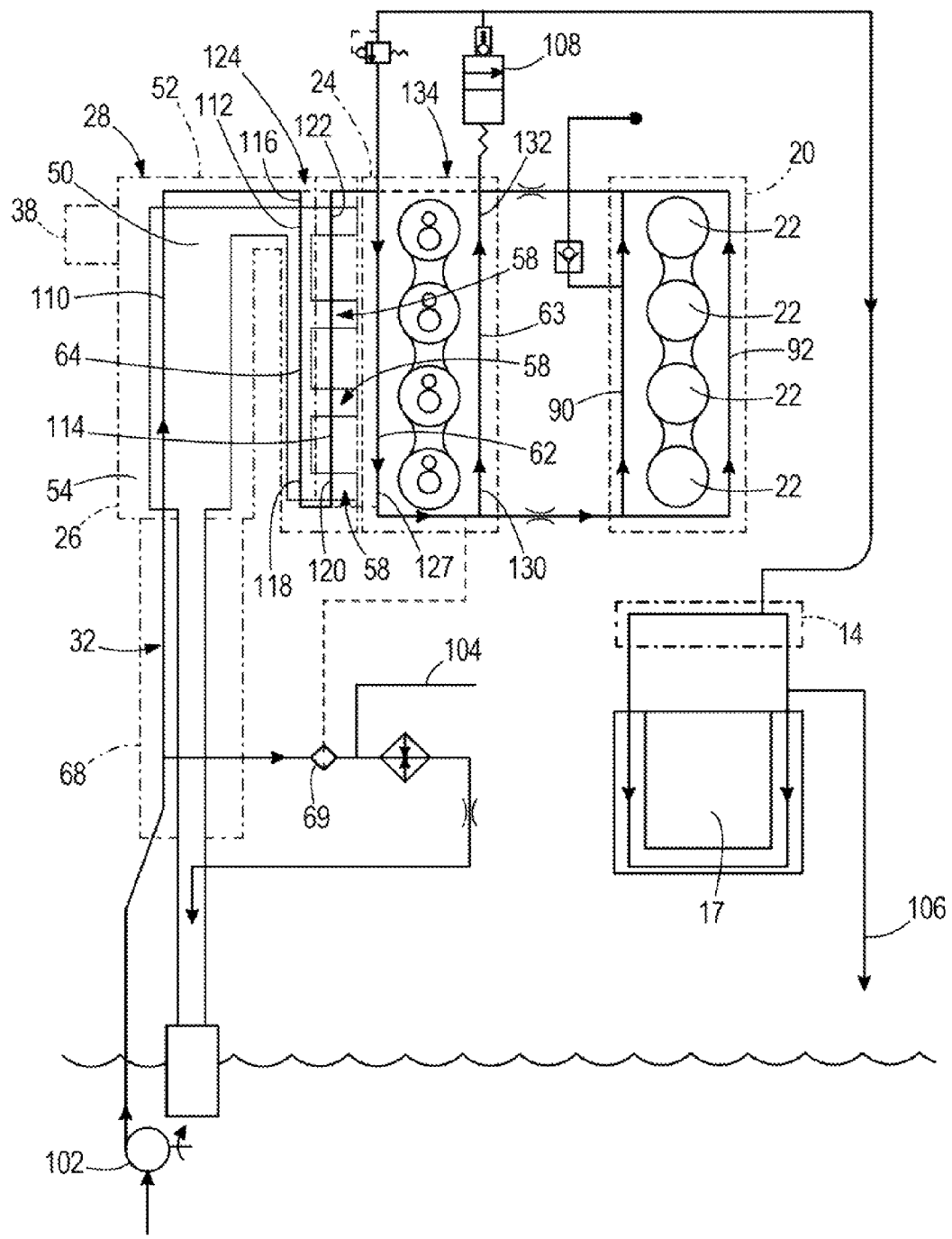
Figure 23:
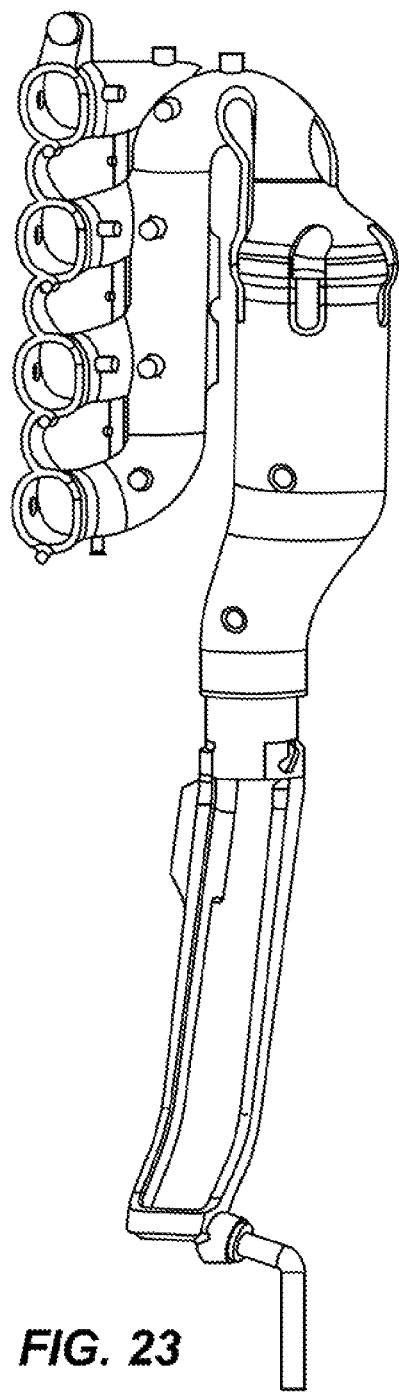
FIGS. 23-26 show a water core (the cooling passages) of the outboard marine propulsion device exhaust system described and shown above.
Figure 24:
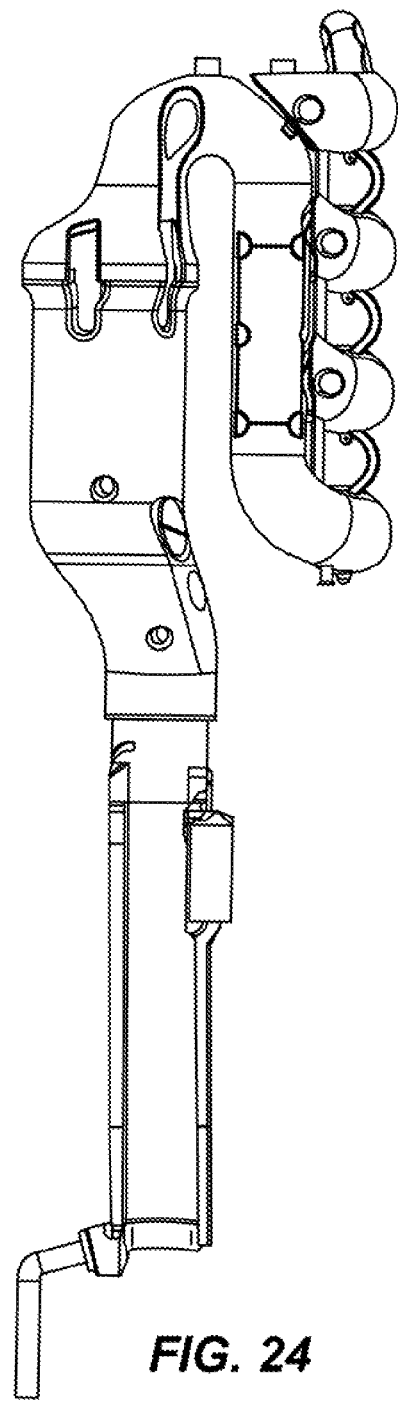
Figure 26:
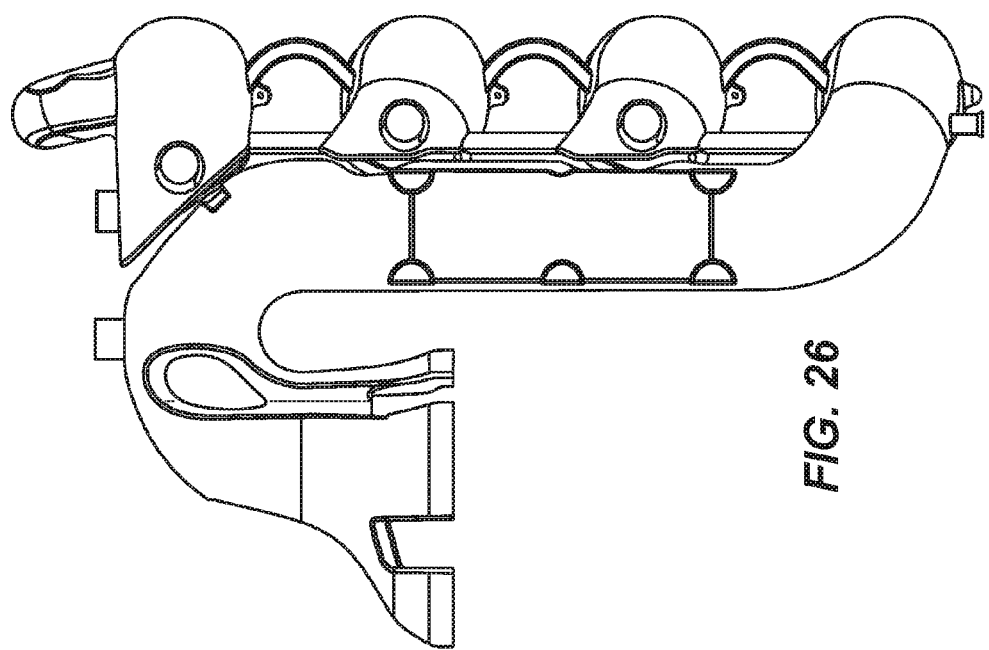
Figure 25:
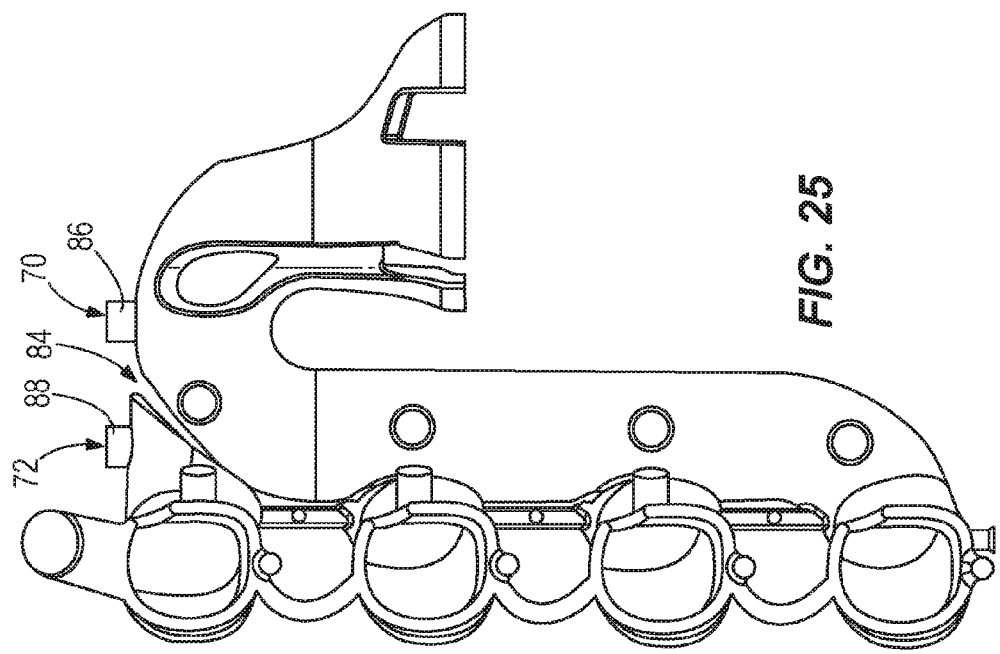

FIGS. 21 and 22 show schematics of exemplary cooling systems for the outboard marine propulsion device 10, wherein the cooling water makes three passes through the cooling water jacket 52 on the exhaust manifold 28. Further discussion of these figures is provided herein below.

FIGS. 23-26 show the water core (the cooling passages) of the outboard marine propulsion device 10 described and shown above. The cooling water jacket 68 on the lower exhaust pipe 32 picks up water in the gearcase 18 (taken from the body of water outside the outboard marine propulsion device 10), directs it upward to the cooling water jacket 54 on the catalyst housing 26, and then into the cooling water jacket 52 on the exhaust manifold 28. As shown well in FIGS. 25 and 26, there is a gap or disconnect 84 between the cooling jacket passages that cool the collecting exhaust passage 64 and the cooling jacket passages that cool the exhaust manifold inlet runners 58. As discussed briefly above, a first small opening 70 may exist in the cooling water jacket 54 at the top of the exhaust manifold 28 (at the top of the bend 66) and a second small opening 72 may exist in the cooling water jacket 52 at the top of the exhaust manifold inlet runners 58. The first and second small openings 70, 72 may be surrounded by a first small boss (around 86) on the top of the bend 66 and a second small boss (around 88) on the top of the exhaust manifold inlet runners 58. These two small bosses (and the first and second small openings 70, 72) may be connected together with a passage or hose to provide an air bleed between the two separated cooling passages, thereby preventing air pockets from being trapped in the cooling passages.

Referring to FIGS. 1-10 and 20, it will thus be seen that the present disclosure provides an outboard marine propulsion device 10 having an internal combustion engine 12 that includes a cylinder head 24 and a cylinder block 20. An exhaust manifold 28 discharges exhaust gases from the engine 12 to a vertically elongated exhaust tube 32. The exhaust manifold 28 has a plurality of inlet runners 58 that receive the exhaust gases from the engine 12 and a collecting exhaust passage 64 that conveys the exhaust gases upwardly from the plurality of inlet runners 58 to a bend 66 that redirects the exhaust gases downwardly towards the exhaust tube 32. A cooling water jacket 52 is provided on the exhaust manifold 28. The cooling water jacket 52 conveys cooling water alongside the exhaust manifold 28.

Referring to FIGS. 21 and 22, a series of cooling passages 62, 63 are formed in the cylinder head 24. The cooling passages 62, 63 convey the cooling water from the cooling water jacket 52 on the exhaust manifold 28 to a series of cooling passages 90, 92 in the cylinder block 20. A catalyst housing 26 is coupled to the exhaust manifold 28 and a cooling water jacket 54 is disposed on the catalyst housing 26. The cooling water jacket 54 carries cooling water alongside the catalyst housing 26. A flow disrupter disrupts flow of cooling water past the catalyst housing 26 to the cooling water jacket 54 on the exhaust manifold 28. In this example, the flow disrupter is formed by the gasket 42 that is disposed between the cooling water jacket 54 on the catalyst housing 26 and the cooling water jacket 52 on the exhaust manifold 28. The gasket 42 has a circumferential surface 94 and has a non-symmetric series of holes 82 (see FIG. 20) that are formed around the circumferential surface 94. The holes 82 are shaped and spaced apart along the circumferential surface 94 to direct flow of cooling water to non-jacketed areas, e.g. 96 (see FIG. 4) of the exhaust manifold 28. The holes 82 can further be shaped and spaced apart to control flow of cooling water towards the one or more gas concentration sensors 36, 37 that sense oxygen content of the exhaust gases flowing through the exhaust system 34. In this example, the sensors 36, 37 extend through bosses 98, 100 (see FIG. 8) which create potential hot spots in the exhaust system 34, which otherwise would create problems if not for the redirection of cooling water via the noted flow disrupter.

Referring to FIGS. 21 and 22, a pump 102 pumps cooling water from upstream to downstream through the cooling water jacket 52 on the lower exhaust pipe 32, the cooling water jacket 54 on the catalyst housing 26, the cooling water jacket 52 on the exhaust manifold 28, the series of cooling passages 62, 63 in the cylinder head 24, and the series of cooling passages 90, 92 in the cylinder block 20, etc. A tell-tale outlet 104 is configured to receive cooling water at a location that is upstream of the cooling water jacket on the catalyst housing 26. The tell-tale outlet 104 receives the cooling water through a strainer 69 and then discharges it from the outboard marine propulsion device 10. A portion of the cooling water is also discharged to the flow of exhaust gases via the noted water sprayer 76 (see FIG. 11). The location of the tell-tale outlet 104 upstream of the catalyst 30 can vary. In this example, the tell-tale outlet 104 is connected to and receives the cooling water from the cooling water jacket 68 on the exhaust tube 32. Cooling water located downstream of the catalyst housing 26 is discharged from the outboard marine propulsion device 10 only through an actively controlled outlet 106. More specifically a thermostat 108 actively controls flow of cooling water to the outlet 106. The thermostat 108 is located downstream of the cooling passages 62, 63 in the cylinder head 24 and is configured to reduce flow of cooling water through the engine 12 at idle engine speeds and to increase flow of cooling water through the engine 12 at wide open throttle speed. All non-varying discharge paths (i.e. tell-tale, or exhaust sprayer) for cooling water are located upstream of the cooling water jacket 54 on the catalyst housing 26, thus reducing condensation in the exhaust system 34 upstream of the catalyst 30.

With continued reference to FIGS. 21 and 22, the cooling water jacket 52 on the exhaust manifold 28 includes a series of cooling passages 110, 112, 114 including a first cooling passage 110 that conveys cooling water upwardly to the bend 66, a second cooling passage 112 that conveys the cooling water downwardly past the collecting exhaust passage 64, and a third cooling passage 114 that conveys cooling water back upwardly past the collecting exhaust passage 64 and exhaust manifold inlet runners 58 to the engine 12, namely the cylinder head 24 and cylinder block 20. The second cooling passage 112 has an inlet end 116 and an outlet end 118. The third cooling passage 114 has an inlet end 120 and an outlet end 122. An air purge passage 124 connects the inlet end 116 of the second cooling passage and the outlet end 122 of the third cooling passage 114. In this manner, when the engine 12 is shut down, the air purge passage 124 allows air to flow from the outlet end 122 of the third cooling passage 114 to the inlet end 116 of the second cooling passage 112. When the engine 12 is started, the air purge passage 124 allows air to flow from the inlet end 116 of the second cooling passage 112 to the outlet end 122 of the third cooling passage 114. As discussed herein above, the type of air purge passage 124 can vary and as discussed herein above can include at least one of a jumper hose, a cross-drilled hole, a cast hole, and a cast-in-metal tube. Preferably, the air purge passage 124 is located vertically above the exhaust manifold inlet runners 58, the collecting exhaust passage 64 and the bend 66.

With continued reference to the embodiment shown in FIG. 22, the series of cooling passages 62, 63 in the cylinder head 24 includes a first water cooling passage 62 and a second cooling passage 63. The first cooling passage 62 conveys the cooling water downwardly in the cylinder head 24 and the second water cooling passage 63 conveys the cooling water upwardly in the cylinder head 24. The first cooling passage 62 includes an inlet end 126 and an outlet end 127. The second cooling passage 63 includes an inlet end 130 and an outlet end 132. An air purge passage 134 connects the inlet end 126 of the first cooling passage 62 to the outlet end 132 of the second water cooling passage 63. In this example, when the engine 12 is shut down, the air purge passage 134 allows air to flow from the inlet end 126 of the first cooling passage 62 to the outlet end 132 of the second cooling passage 63, thus more efficiently purging air from the system. The air purge passage 134 can optionally include a milled hole, a drilled hole and/or a gasket.

In the present Description, certain terms have been used for brevity, clearness and understanding. No unnecessary limitations are to be implied therefrom beyond the requirement of the prior art because such terms are used for descriptive purposes only and are intended to be broadly construed. The different embodiments described herein may be used alone or in combination with other apparatuses, systems and methods. Various equivalents, alternatives and modifications are possible within the scope of the appended claims.

What is claimed is:

1. An outboard marine propulsion device comprising:
   an internal combustion engine having a cylinder head and a cylinder block;
   an exhaust manifold that discharges exhaust gases from the internal combustion engine to a catalyst housing and then to a vertically elongated exhaust tube;
   wherein the exhaust manifold has a plurality of inlet runners that receive the exhaust gases from the internal combustion engine, and a vertically extending collecting passage that conveys the exhaust gases from the plurality of inlet runners to a bend that redirects the exhaust gases downwardly towards the exhaust tube;
   a cooling water jacket on the catalyst housing that carries cooling water alongside the catalyst housing;
   a cooling water jacket on the exhaust manifold that conveys the cooling water alongside the exhaust manifold;
   at least one cooling passage in the internal combustion engine that conveys the cooling water through the internal combustion engine;
   a pump that pumps cooling water from upstream to downstream through the cooling water jacket on the catalyst housing, the cooling water jacket on the exhaust manifold, and then the at least one cooling passage in the internal combustion engine; and
   a tell-tale outlet that receives a portion of the cooling water upstream of the cooling water jacket on the catalyst housing and discharges the portion of the cooling water from the outboard marine propulsion device via an uncontrolled, non-varying outlet passage.

2. The outboard marine propulsion device according to claim 1, further comprising a cooling water jacket on the exhaust tube, wherein the pump pumps cooling water from upstream to downstream through the cooling water jacket on the exhaust tube to the cooling water jacket on the catalyst housing, and wherein the tell-tale outlet is connected to and receives the cooling water from the cooling water jacket on the exhaust tube.

3. The outboard marine propulsion device according to claim 2, wherein a remaining portion of the cooling water which is downstream of the catalyst housing is discharged from the outboard marine propulsion device only through an actively-controlled outlet.

4. The outboard marine propulsion device according to claim 3, comprising a thermostat that actively controls flow of cooling water to the outlet.

5. The outboard marine propulsion device according to claim 4, wherein the thermostat is configured to reduce flow of cooling water through the engine at idle engine speeds and increase flow of cooling water through the internal combustion engine at wide open throttle speed.

6. The outboard marine propulsion device according to claim 4, comprising a catalyst disposed in the catalyst housing.

7. The outboard marine propulsion device according to claim 6, wherein the tell-tale and any and all other uncontrolled, non-varying outlet passages for cooling water are located upstream of the cooling water jacket on the catalyst housing, thus allowing the cooling water to be warmer downstream of the catalyst and reducing condensation in the exhaust passages upstream of the catalyst.

8. An outboard marine propulsion device comprising:
   an internal combustion engine having a cylinder head and a cylinder block;
   an exhaust manifold that discharges exhaust gases from the internal combustion engine to a vertically elongated exhaust tube;
   wherein the exhaust manifold has a plurality of inlet runners that receive the exhaust gases from the internal combustion engine, and a vertically extending collecting passage that conveys the exhaust gases from the plurality of inlet runners upwardly to a bend that redirects the exhaust gases downwardly towards the exhaust tube; and
   a cooling water jacket on the exhaust manifold, the cooling water jacket comprising a series of cooling passages including a first cooling passage that conveys cooling water upwardly to the bend, a second cooling passage that conveys the cooling water downwardly past the collecting passage, and third cooling passage that conveys the cooling water back upwardly past the collecting passage and inlet runners to the internal combustion engine;
   wherein the second cooling passage has an inlet end and an outlet end, and wherein the third cooling passage has an inlet end and an outlet end, and further comprising an air purge passage connecting the inlet end of the second cooling passage to the outlet end of the third cooling passage.

9. The outboard marine propulsion device according to claim 8, wherein when the internal combustion engine is shut down, the air purge passage allows air to flow from the outlet end of the third cooling passage to the inlet end of the first cooling passage and wherein when the internal combustion engine is started, the air purge passage allows air to flow from the inlet end of the first cooling passage to the outlet end of the third cooling passage.

10. The outboard marine propulsion device according to claim 9, wherein the air purge passage comprises at least one of a jumper hose, a cross-drilled hole, a cast hole, and a cast-in-metal tube.

11. The outboard marine propulsion device according to claim 9, wherein the air purge passage is located above the plurality of inlet runners, the collecting passage, and the bend.

12. An outboard marine propulsion device comprising:
an internal combustion engine having a cylinder head and a cylinder block;
an exhaust manifold that discharges exhaust gases from the internal combustion engine towards a vertically elongated exhaust tube;
wherein the exhaust manifold has a plurality of inlet runners that receive the exhaust gases from the internal combustion engine, and a vertically extending collecting passage that conveys the exhaust gases from the plurality of inlet runners to a bend that redirects the exhaust gases downwardly towards the exhaust tube;
a cooling water jacket on the exhaust manifold that conveys cooling water alongside the exhaust manifold; and
a series of cooling passages in the cylinder head that receives the cooling water;
wherein the series of cooling passages in the cylinder head comprises a first cooling passage that conveys the cooling water downwardly in the cylinder head and a second cooling passage that conveys the cooling water upwardly in the cylinder head, and
wherein the first cooling passage comprises an inlet end and an outlet end, and wherein the second cooling passage comprises an inlet end and an outlet end, and further comprising an air purge passage connecting the inlet end of the first cooling passage to the outlet end of the second cooling passage.

13. The outboard marine propulsion device according to claim 12, when the internal combustion engine is shut down, the air purge passage allows air to flow from the inlet end of the first cooling passage to the outlet end of the second cooling passage.

14. The outboard marine propulsion device according to claim 13, wherein the air purge passage comprises at least one of a milled hole, a drilled hole and a gasket.

15. An outboard marine propulsion device comprising:
an internal combustion engine having a cylinder head and a cylinder block;
an exhaust manifold that discharges exhaust gases from the internal combustion engine to a catalyst housing and a vertically elongated exhaust tube;
wherein the exhaust manifold has a plurality of inlet runners that receive the exhaust gases from the internal combustion engine, and a collecting passage that conveys the exhaust gases upwardly from the plurality of inlet runners to a bend that redirects the exhaust gases downwardly towards the exhaust tube;
a cooling water jacket on the catalyst housing that carries cooling water alongside the catalyst housing;
a cooling water jacket on the exhaust manifold that conveys cooling water alongside the exhaust manifold; and
a flow disrupter that disrupts flow of cooling water past the catalyst housing to the cooling water jacket on the exhaust manifold;
wherein the flow disrupter comprises a gasket disposed between the cooling water jacket on the catalyst housing and the cooling water jacket on the exhaust manifold;
wherein the gasket has a circumferential surface and has a non-symmetric series of holes formed through the circumferential surface.

16. The outboard marine propulsion device according to claim 15, wherein the holes in the non-symmetric series of holes are spaced apart along the circumferential surface and are shaped to direct flow of cooling water to non-jacketed areas of the exhaust manifold.

17. The outboard marine propulsion device according to claim 16, wherein the holes in the non-symmetric series of holes are shaped and spaced apart to control flow of cooling water towards one or more oxygen sensors that sense oxygen content of the exhaust gases.

18. The outboard marine propulsion device according to claim 15, comprising a catalyst disposed in the catalyst housing.

19. The outboard marine propulsion device according to claim 15, wherein the flow disruptor is a reduced cross-sectional area of cooling water jacket.

* * * * *